United States Patent [19]

Irwin et al.

[11] Patent Number: 5,533,107

[45] Date of Patent: Jul. 2, 1996

[54] METHOD FOR ROUTING CALLS BASED ON PREDETERMINED ASSIGNMENTS OF CALLERS GEOGRAPHIC LOCATIONS

[75] Inventors: Janine M. Irwin, Duluth; James M. Seymour; Iris Y. Chen, both of Roswell; James M. Davis, Alpharetta; David C. Sowell, Atlanta; Nailesh B. Desai, Norcross; Julia B. Torbert, Stone Mountain, all of Ga.

[73] Assignee: BellSouth Corporation, Atlanta, Ga.

[21] Appl. No.: 204,677

[22] Filed: Mar. 1, 1994

[51] Int. Cl.$^6$ .......................... H04M 3/42; H04M 15/00
[52] U.S. Cl. .......................... 379/201; 379/207; 379/127; 379/221
[58] Field of Search .......................... 379/97, 207, 201, 379/211, 115, 127, 112, 113, 114

[56] References Cited

U.S. PATENT DOCUMENTS

| | | |
|---|---|---|
| 3,556,530 | 1/1971 | Barr et al. . |
| 3,614,328 | 10/1971 | McNaughton et al. . |
| 3,928,724 | 12/1975 | Byram et al. . |
| 4,139,739 | 2/1979 | von Meisteer et al. . |
| 4,164,025 | 8/1979 | Dubnowski et al. ............ 364/900 |
| 4,178,476 | 12/1979 | Frost . |
| 4,191,860 | 3/1980 | Weber . |
| 4,310,727 | 1/1982 | Lawser . |
| 4,313,035 | 1/1982 | Jordan et al. . |
| 4,341,929 | 7/1982 | Alexander et al. . |
| 4,577,062 | 3/1986 | Hilleary et al. . |
| 4,608,460 | 8/1986 | Carter et al. . |
| 4,737,983 | 4/1988 | Fraventhal ............ 379/221 |
| 4,757,267 | 7/1988 | Riskin ............ 379/113 |
| 4,797,818 | 1/1989 | Cotter ............ 364/401 |
| 4,924,510 | 5/1990 | Le ............ 379/221 |
| 5,046,088 | 9/1991 | Margulies ............ 379/211 |
| 5,095,505 | 3/1992 | Finvcane ............ 379/201 |
| 5,136,636 | 8/1992 | Wegrzynowicz ............ 379/207 |
| 5,168,515 | 12/1992 | Gechter ............ 379/268 |
| 5,214,688 | 5/1993 | Szlam ............ 379/67 |
| 5,253,288 | 10/1993 | Frey ............ 379/221 |
| 5,259,023 | 11/1993 | Katz ............ 379/88 |

*Primary Examiner*—Jeffery Hofsass
*Assistant Examiner*—Thomas F. Presson
*Attorney, Agent, or Firm*—Jones & Askew

[57] ABSTRACT

The present invention is a method that enables a business with multiple locations within a LATA to use a single number for its service. All callers dial the same number to reach the subscriber's business, and a network routes the calls to the most appropriate subscriber location based on the geographic location of the caller, time of day, day of week, and/or percent distribution among subscriber locations. The geographic location of the caller is determined using the calling party number (NPA-NXX-XXXX) and either mapping this number to a wire center (using the NPA-NXX) or to a block group (using the entire NPA-NXX-XXXX). An advantage of Area Number Calling is the granularity of block group routing. Block groups are defined by the Census Bureau and typically encompass a much smaller geographic area than a wire center. Block groups are defined by the Census Bureau for the entire United States. Block groups tend to encompass four to twelve blocks, and they honor natural boundaries, like rivers. This gives an ANC subscriber a greater degree of flexibility in defining which geographic areas should be routed to which subscriber locations. The present invention also provides a method of reducing the amount of geographic data that is transmitted to or stored on a database associated with the routing equipment by routing as a unit intersecting regions of multiple subscriber data tables.

49 Claims, 20 Drawing Sheets

ANC NUMBER = DEDICATED NXX NUMBER

ANC QUERY PROCESSING IN SCP

REGION SET COMPRESSION AND DATA TABLES

SECTION MAP
MAPS 1 & 2 OF FIG. 3a INTERSECTED

TABLE 3 - BLOCK GROUP-TO-SECTION MAP TABLE
FOR SECTION MAP (MAPS 1 & 2 OF FIG. 3a INTERSECTED)

| BG | S | BG | S | BG | S | BG | S | BG | S |
|----|---|----|---|----|---|----|---|----|---|
| 1  | 1 | 6  | 1 | 11 | 1 | 16 | 2 | 21 | 2 |
| 2  | 1 | 7  | 1 | 12 | 2 | 17 | 2 | 22 | 2 |
| 3  | 1 | 8  | 4 | 13 | 4 | 18 | 2 | 23 | 3 |
| 4  | 4 | 9  | 4 | 14 | 4 | 19 | 3 | 24 | 3 |
| 5  | 4 | 10 | 4 | 15 | 3 | 20 | 3 | 25 | 3 |

MONDAY - FRIDAY
TABLE 4 - SECTION-TO-REGION
TABLE FOR MAP 1 OF FIG. 3a

| S | R |
|---|---|
| 1 | A |
| 2 | B |
| 3 | C |
| 4 | B |

SATURDAY - SUNDAY
TABLE 5 - SECTION-TO-REGION
TABLE FOR MAP 2 OF FIG. 3a

| S | R |
|---|---|
| 1 | A |
| 2 | B |
| 3 | C |
| 4 | C |

PROCESSING OF TRANSLATION TABLES

SA

| 1 | 4 | 7 | 10 |
|---|---|---|----|
| 2 | 5 | 8 | 11 |
| 3 | 6 | 9 | 12 |

MAP 1     MAP 2     MAP 3

REGIONS: 0, A, B, C, D

FIG. 7

TABLE 6 - INTERMEDIATE RESULT (IR) FOR MAP #1

| gc | RS  | s | gc | RS  | s | gc | RS  | s | gc | RS  | s |
|----|-----|---|----|-----|---|----|-----|---|----|-----|---|
| 1  | {A} | 1 | 4  | {B} | 3 | 7  | {B} | 3 | 10 | {B} | 3 |
| 2  | {A} | 1 | 5  | {A} | 1 | 8  | {B} | 3 | 11 | {B} | 3 |
| 3  | {0} | 2 | 6  | {A} | 1 | 9  | {C} | 4 | 12 | {B} | 3 |

TABLE 7 - BLOCK GROUP-TO-SECTION (BTS) TABLE FOR MAPS #

| gc | s | gc | s | gc | s | gc | s |
|----|---|----|---|----|---|----|---|
| 1  | 1 | 4  | 3 | 7  | 3 | 10 | 3 |
| 2  | 1 | 5  | 1 | 8  | 3 | 11 | 3 |
| 3  | 2 | 6  | 1 | 9  | 4 | 12 | 3 |

SR1

| s | r |
|---|---|
| 1 | A |
| 2 | 0 |
| 3 | B |
| 4 | C |

FIG. 8a

SECTION TO REGION (SR) TABLES FOR MAP

TABLE 8 - INTERMEDIATE RESULT (IR) FOR MAPS #1 AND #2

| gc | RS | s | gc | RS | s | gc | RS | s | gc | RS | s |
|----|------|---|----|------|---|----|-----|---|----|-------|---|
| 1  | {A}  | 1 | 4  | {B}  | 3 | 7  | {B} | 3 | 10 | {B,0} | 6 |
| 2  | {A}  | 1 | 5  | {A,B}| 4 | 8  | {B} | 3 | 11 | {B}   | 3 |
| 3  | {0}  | 2 | 6  | {A}  | 1 | 9  | {C} | 5 | 12 | {B}   | 3 |

TABLE 9 - BLOCK GROUP-TO-SECTION (BTS) TABLE FOR MAPS

| gc | s | gc | s | gc | s | gc | s |
|----|---|----|---|----|---|----|---|
| 1  | 1 | 4  | 3 | 7  | 3 | 10 | 6 |
| 2  | 1 | 5  | 4 | 8  | 3 | 11 | 3 |
| 3  | 2 | 6  | 1 | 9  | 5 | 12 | 3 |

SR1

| s | r |
|---|---|
| 1 | A |
| 2 | 0 |
| 3 | B |
| 4 | A |
| 5 | C |
| 6 | B |

SR2

| s | r |
|---|---|
| 1 | A |
| 2 | 0 |
| 3 | B |
| 4 | B |
| 5 | C |
| 6 | 0 |

SECTION TO REGION (SR) TABLES FOR MAPS

FIG. 8b

TABLE 10 - INTERMEDIATE RESULT (IR) FOR MAPS

| gc | RS | s | gc | RS | s | gc | RS | s | gc | RS | s |
|---|---|---|---|---|---|---|---|---|---|---|---|
| 1 | {A} | 1 | 4 | {B} | 3 | 7 | {B} | 3 | 10 | {B,0} | 6 |
| 2 | {A} | 2 | 5 | {A,B} | 4 | 8 | {B} | 3 | 11 | {B,D} | 8 |
| 3 | {0} | 2 | 6 | {A} | 1 | 9 | {C} | 5 | 12 | {B,C} | 7 |

TABLE 11 - BLOCK GROUP-TO-SECTION (BTS) TABLE FOR MAPS

| gc | s | gc | s | gc | s | gc | s |
|---|---|---|---|---|---|---|---|
| 1 | 1 | 4 | 3 | 7 | 3 | 10 | 6 |
| 2 | 1 | 5 | 4 | 8 | 3 | 11 | 8 |
| 3 | 2 | 6 | 1 | 9 | 5 | 12 | 7 |

SR1

| s | r |
|---|---|
| 1 | A |
| 2 | 0 |
| 3 | B |
| 4 | A |
| 5 | C |
| 6 | B |
| 7 | B |
| 8 | B |

SR2

| s | r |
|---|---|
| 1 | A |
| 2 | 0 |
| 3 | B |
| 4 | B |
| 5 | C |
| 6 | 0 |
| 7 | B |
| 8 | B |

SR3

| s | r |
|---|---|
| 1 | A |
| 2 | 0 |
| 3 | B |
| 4 | B |
| 5 | C |
| 6 | B |
| 7 | C |
| 8 | D |

SECTION TO REGION (SR) TABLES FOR MAPS

*FIG. 8c*

DETERMINE SUBSCRIBER LOCATION

DETERMINE DEFAULT LOCATION

DETERMINE CALLER'S GEOCODE

ROUTE TO GLOBAL DEFAULT LOCATION

EVALUATE DIALED DIGITS

EVALUATE DIALED DIGITS

DETERMINE TREATMENT FOR OUT OF AREA CALLERS

DETERMINE LOCATION FOR CELLULAR CALLERS

METHOD FOR ROUTING CALLS BASED ON PREDETERMINED ASSIGNMENTS OF CALLERS GEOGRAPHIC LOCATIONS

TECHNICAL FIELD

The present invention relates to the field of switched telephony and in particular to a method of routing a call corresponding to a dedicated number of a subscriber to a particular subscriber location of a plurality of subscriber locations based on service parameters of the subscriber and in part on the geographic location of the caller.

BACKGROUND OF THE INVENTION

Businesses will often have multiple business locations to serve a large area. The multiple business locations generally are scattered throughout various regions of the business' area of service, so that customers may conveniently seek the service of the business within the customer's geographic area. Also, it is convenient for a business to have a location within a customer's geographic area to minimize service response time when the business provides a service in which the business either delivers and/or picks up goods at the customer's location. This is especially true for a franchised pizza delivery business for example.

While it is convenient and efficient for a business to have multiple locations in various regions of the business' area of service, it is likewise convenient and efficient for the business to have a single advertised directory number that is applicable to all of the multiple business locations within the business' area of service. Having a single advertised number helps to eliminate the expenses which would otherwise be associated with advertising the different locations individually with a different phone number for each of the locations.

Solutions to this problem have been addressed whereby businesses obtain an 800 telephone number which is used as the single business number and callers of the 800 number are routed to a dealer based upon the NPA-NXX of the calling party's number, NPA-NXX-XXXX, (where NPA is the calling party's area code, NXX is the central office code and XXXX identifies a particular station in the central office code). U.S. Pat. No. 4,757,267 to Riskin discloses a system in which a call is routed to a nearby dealer based upon the coordinates of the central office (NPA-NXX) serving the dealer. The system first receives a call from a caller then outdials to a dealer, and crossconnects the incoming call to the outgoing call if the dealer is available. The system monitors both lines during this process. This process can be both inefficient and uneconomical.

U.S. Pat. No. 5,136,636 to Wegrynowicz discloses a method of routing a call in which a primary database is accessed using the caller's NPA and 800 directory number to provide an access key which identifies the customer. The access key plus the calling party's NPA-NXX is used to locate the translation information in a second database to identify a local dealer.

While each of these patents disclose a method of routing a call to a business location based on the caller's NPA-NXX, neither discloses a method for accomplishing routing on a sufficiently granular basis when a business has multiple locations within the NXX. Moreover neither patent discloses a method for mapping a calling party's geographic location when fine granularity is required. With NPA-NXX routing, a multiple location business within an area served by an NPA-NXX (central office) is not sufficiently able to distinguish and therefore route calls to the most appropriate location.

Thus, there is a need in the art to provide a method for routing calls in which a business is able to route calls to the most appropriate business location within an NPA-NXX.

SUMMARY OF THE INVENTION

The present invention generally provides a method of routing a call, made to an area number calling (ANC) number (a single number) of a subscriber, to a particular subscriber location of a plurality of subscriber locations based on service parameters of the subscriber and in part on the geographic location of the caller. The ANC system is preferably implemented in a modern public, switched telephone network. The ANC system is controlled from a service control point (SCP) in such a telephone network. The ANC system is set up by means of a service management system (SMS) that provides subscription data to the service control point (SCP).

More particularly, the present invention provides a method that enables a business with multiple locations within a telephone network LATA (local access transport area) to utilize a single number for its service. All callers dial the same number to reach the subscriber's business, and a telephone network routes the calls to the most appropriate subscriber location based on the geographic location of the caller, time of day, day of week, and/or percent distribution among subscriber locations. The geographic location of the caller is determined using the calling party's number (NPA-NXX-XXXX) and either assigning this number to a wire center (using the NPA-NXX) or to a block group (using the entire NPA-NXX-XXXX). The subscriber chooses whether wire center routing is sufficient or if the more granular block group routing is needed. At the time of subscription, the subscriber will assign the wire centers or block groups within his or her service area to the subscriber locations to which calls from these geographic areas should be routed.

An advantage of the present invention is the granularity of block group routing. Block groups are defined by the Census Bureau and typically encompass a much smaller geographic area than a wire center. Block groups are defined by the Census Bureau for the entire United States. Demographic information is available that is categorized by block group. The size of a block group varies based on population, so block group sizes would vary from urban to suburban to rural areas. Block groups tend to encompass four to twelve blocks, and they honor natural boundaries, like rivers. This gives an ANC subscriber a greater degree of flexibility in defining which geographic areas should be routed to which subscriber locations. This is especially important for those businesses that have multiple locations within a single wire center, making wire center routing insufficient for getting callers to the most appropriate location.

A wire center is defined as the location of one or more local telephone switching systems of the telephone service provider (telephone company). A wire center describes the geographic area served by one or more local switching systems.

In accordance with the present invention, the geographic representation of the subscriber's area of service is termed a map. A map is represented by one or more data tables. The subscriber can have one or more maps as part of the ANC system. During ANC call processing, a map is considered "active" during a particular interval of time (e.g., weekday map, weekend map, etc.). A subscriber may divide each map into regions. For example, one map may be divided into a north region and south region, and another map may be divided into an east and west region. A map which is divided into regions is termed a region set.

Because vast amounts of data are associated with block group routing and with providing multiple maps for highly populated areas, storing and accessing data can be problematic. The present invention, in addition to providing granular routing, provides a method of reducing the amount of data that is transmitted to or stored on the service control point (SCP). Data reduction is possible by creating sections from the service maps. Sections are formed by "overlaying" or intersecting the regions from all of a subscriber's region sets or maps to determine the areas from which calls will be routed to the same location despite being designated within a differently sized region of another region set. The sections are then utilized as part of the present invention to make an appropriate determination of a particular subscriber location to which a call made to an area number calling number should be routed. Sections help to optimize efficiency in routing calls.

In addition, the telephone service provider maintains a database correlating telephone numbers to block groups and updates it daily to reflect service order activity. Thus, people signing up for new telephone service, people changing their telephone numbers, or people discontinuing telephone service are automatically accounted for in the block group database through these daily updates. This alleviates the ANC subscriber of the responsibility of providing and maintaining a database to locate its customers geographically.

The present invention also provides a method of routing calls to a default location when insufficient data is available to route a call to the preferred subscriber location indicated by the subscriber, as well as a method of routing a call from a cellular caller to a default subscriber location. A method of determining whether a caller is out of the subscriber's area of service also is provided by the present invention.

Therefore, it is an object of the present invention to route calls corresponding to a subscriber's ANC number to a particular subscriber location out of a plurality of subscriber locations.

It is a further object of the present invention to route area number calls according to a subscriber's area of service.

It is also an object of the present invention to provide sufficient granular routing to subscribers with multiple locations serving an area serviced by a single telephone company central office.

It is a further object of the present invention to route area number calls on a block group level.

It is also an object of the present invention to select the type of routing that is implemented from a plurality of routing levels such as between block group or wire center routing.

It is an additional object to route ANC calls to a default subscriber location when insufficient data is available to route the call to a subscriber's preferred location.

It is yet another object of the present invention to reduce the amount of data that is stored to or transferred from a database associated with routing calls.

It is yet another object to integrate different formats of subscriber data before sending such data from the service management system (SMS) to the service control point (SCP).

It is yet another object to verify different formats of subscriber data before sending it from the service management system (SMS) to the service control point (SCP) of the telephone network.

BRIEF DESCRIPTION OF THE DRAWINGS

FIG. 7 illustrates a subscriber's area of service, maps and regions.

FIG. 8a illustrates the derivation of geographic code identifiers for a map.

FIG. 8b illustrates the derivation of geographic code identifiers for two maps.

FIG. 8c illustrates the derivation of geographic code identifiers for three maps.

DETAILED DESCRIPTION OF THE INVENTION

Figure 1:
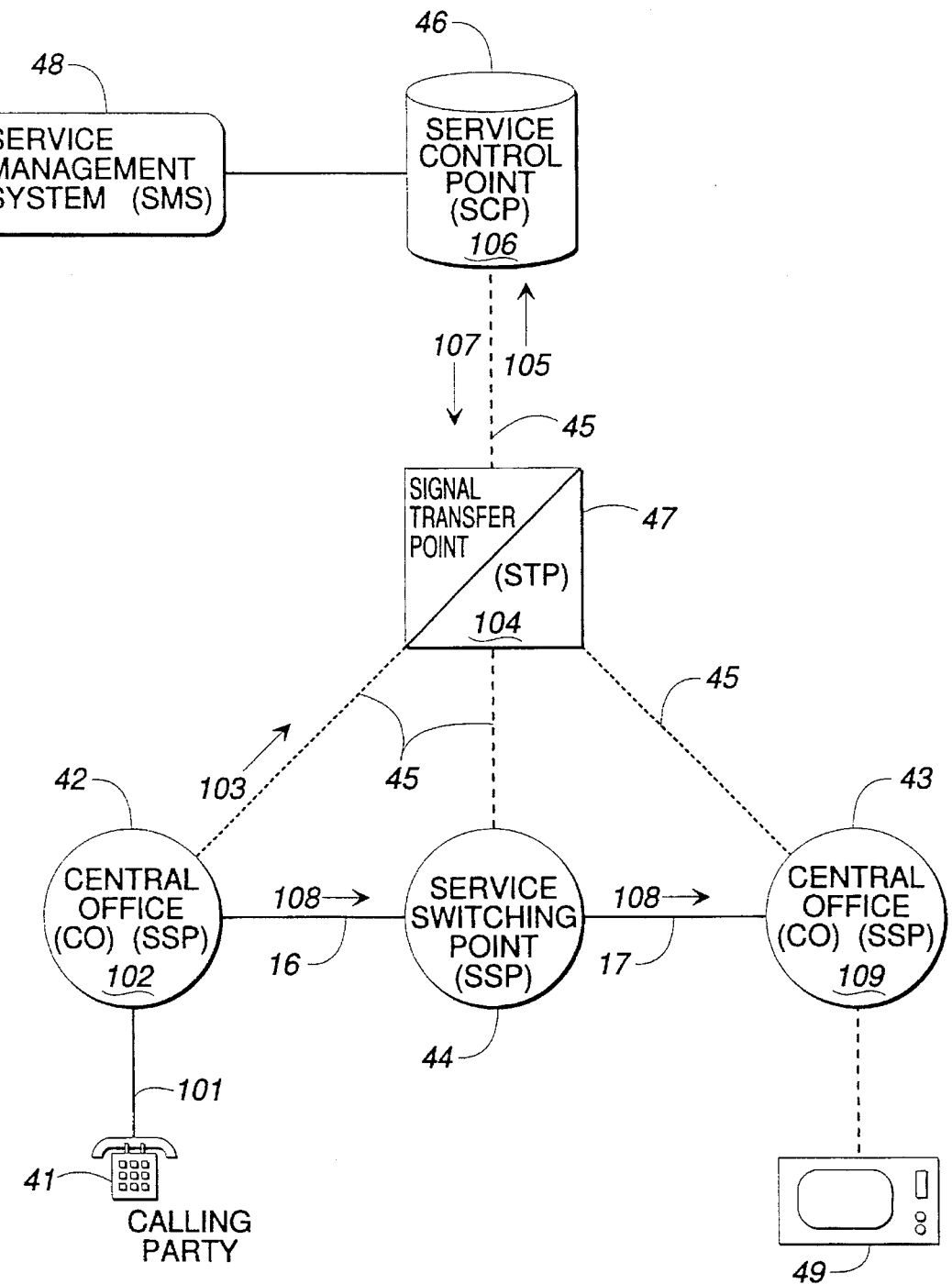
FIG. 1 is a block diagram of a telephone network used in connection with present invention and the call processing protocol for an ANC subscriber that uses a dialed number with a dedicated NXX three digit number as the ANC number.

Turning now to the drawing figures in which like numbers reference like parts or steps, several alternate embodiments of the present invention will now be described. As generally shown in FIG. 1, the present invention is preferably implemented in a modern public, switched telephone network commonly referred to as an Advanced Intelligent Network (AIN). Most of the intelligence of the network resides in the components shown in FIG. 1. The present invention contemplates, but it is not limited to, the various embodiments disclosed herein.

FIG. 1 shows a block diagram of the AIN telephone network used in implementing the preferred embodiment for Area Number Calling (ANC) in accordance with the present invention. A calling party telephone 41 is connected to the caller's central office (CO) 42 which is a service switching point (SSP). An ANC subscriber location 49 is connected to a central office (CO) 43 which is likewise a service switching point (SSP). The service switching points SSPs 42, 44 and 43 are connected by Signaling System 7 (SS7) data links 45 to a service control point (SCP) 46. A signal transfer point (STP) 47 may be provided between the service switching points (SSPs) 42, 44 and 43 and service control point (SCP) 46 along the SS7 data links 45 to route call processing queries between the service switching points (SSPs) 42, 44, and 43 and the service control point (SCP) 46. In setting up a call from caller 41 to subscriber location 49, the caller's central office (CO) 42 communicates with a service switching point (SSP) 44 and central office 43 via digital data communication channel 45. Once the call is routed a communication path is set up between the call and subscriber location along paths 16 and 17.

Currently, these data links 45 are 56 kilobit per second bi-directional data links employing a signaling protocol referred to as SS7. The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs data packets that include the usual beginning and terminating flags and a check bit. Additionally, the data packets also have a signal information field that includes a variable length user specific data and a routing label. A service information octet is included in the data packets and identifies a priority of the message, the national network of the destination of the message, and the user name identifying the entity that created the message. Also, certain control and sequence numbers are included within the data packets, the uses and designations of which are known to those skilled in the art and described in the above referenced ANSI specification.

All of the SS7 data packets from the switches (such as 44) go to a signal transfer point (STP) 47. Those skilled in the art will recognize that signal transfer point 47 is simply a multi-port high speed data packet switch that is programmed to respond to the routing information in the appropriate layer of the SS7 protocol, and route the data packet to its intended destination. The signal transfer point is not normally, per se, the destination of a data packet, but merely directs traffic among the other entities on the network that generate and respond to the data packets. It should be noted that signal transfer point devices such as signal transfer point (STP) 47 are conventionally installed in redundant pairs within the network so that if one device fails, its mate takes over until the first signal transfer point (STP) 47 is able to return to service.

Much of the intelligence, and the basis for many of the features of the network, resides in the local service control point (SCP) 46 that is connected to signal transfer point (STP) 47 via SS7 data link 45. As is known to those skilled in the art, service control points are typically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points may be also provided in redundant mated pairs in order to assure reliability and continued operation of the network.

The computing devices implementing service control point (SCP) 46 typically accommodate one to twenty-seven disk drives ranging from 300 megabytes to 1.2 gigabytes per drive, and have main memory on the order of 24 to 192 megabytes. Thus, it will be appreciated that these are large and powerful computing machines. The computers embodying the service control point (SCP) 46 can execute at a speed on the order of 17 million instructions per second. Using the SS7 protocol, this translates to about 50 to 100 transactions (query/response pairs) of network messages per second.

The service control point (SCP) 46 includes databases that identify particular service subscribers. In order to keep the processing of data and calls as simple and generic as possible at switches, such as service switching point (SSP) 42, a relatively small set of triggers are defined at the SSP at particular points in call processing. A trigger in the service switching point (SSP) 42 is an event encountered at some point in call processing that causes the SSP 42 to suspend call processing and generate a data packet to be sent to a service control point. The trigger causes the service control point (SCP) 46 to query its data base to determine the customized calling feature to be provided. The results of the data base inquiry are sent back to the SSP 42 from SCP 46 through service transfer point STP 47. The return data packet includes instructions to the service switching point as to how to process the call. The instruction may be to take some special action as a result of a customized calling service.

The service control point (SCP) 46 is the host for the feature logic, service data, and subscription data. A service management system (SMS) 48 is interfaced with the SCP 46 to provide data to the SCP 46 for carrying out the functions of the ANC system. Using the subscription data in conjunction with the ANC feature logic, discussed below, allows the SCP 46 to provide customized ANC routing for a particular subscriber.

The service control point (SCP) 46 translates the calling party number (CgPN) by means of a geographic code (geocode) database to a wire center (using the NPA-NXX) or a block group (using the entire NPA-NXX-XXXX) associated with the calling party number (CgPN). By using the subscriber specified parameters from the ANC subscriber the SCP 46 locates the current active region set (map) for the subscriber, as explained below, depending on the time of day, day of week and/or percentage of distribution. If wire center or block group routing is not indicated then the calls are routed based only on time of day, day of week, and/or percent distribution. The subscriber specified parameters for the ANC system are provisioned and integrated into the ANC system by the SMS. The SMS uses a decision graph editor which is a programming tool and is available commercially and known to those skilled in the art. Decision graphs are files generated at the SMS 48 from subscription parameters and geographic information relating to block group or wire centers. The decision graphs once created by the SMS 48 are sent to the SCP 46 which uses them to determine the routing for ANC calls. Other programming tools, known to those skilled in the art, are available which may be used to implement the various embodiments of the present invention. For example, service logic language available from AT&T may also be used.

An ANC subscriber, with a subscriber location 49, is assigned a directory number by the telephone service provider as the ANC number. The ANC number has a dedicated NXX segment. A dedicated NXX connotes a three digit number dedicated for use with ANC, for example, NPA-203-XXXX where "203" is the dedicated NXX three digit number. Referring to step 101 of FIG. 1, a caller 41 dials the ANC number for service from ANC subscriber with a location 49. At step 102, the service switching point (SSP)

serving the caller (assuming the caller's CO 42 is an SSP equipped office) recognizes the dedicated NXX of the ANC number for the subscriber as a trigger and suspends call processing. (If the caller's CO 42 did not have SSP capabilities, then it would be set up to recognize the dedicated NXX and route the call to an SSP.) A transactions capabilities application part (TCAP) query, which is a data packet, is formulated by the SSP 42 and launched onto the SS7 signaling network 45 at step 103. At step 104, when the TCAP query arrives at the STP 47, the content of the data packet at the protocol level applicable to the STP 47 is examined. At step 105, the TCAP query is then routed from the STP 47 to the SCP 46 where the ANC feature logic and the subscriber's data reside.

The service control point SCP 46 determines the routing number (the telephone number of subscriber location 49) for the appropriate subscriber location based on the routing information specified in the ANC subscriber's data at step 106. At the SCP 46, data tables are provided that are used to determine the area from which the call originated and the subscriber location to which the call should be directed. The data tables, as discussed below, may contain geographic routing data as well as other subscriber specified parameters. After determining the appropriate subscriber location that should receive the call, such as subscriber location 49, at step 107, the service control point (SCP) 46 sends a TCAP response message back to the service switching point (SSP) 42 that originated the query containing instructions for routing the call. At steps 108 and 109, the SSP 42 routes the call to SSP 44 to central office 43 and then to the subscriber location 49 based on the routing number (telephone number for location 49) returned in the SCP's response message.

In implementing the present invention, the service control point (SCP) 46 can be set up to accept more than one 10-digit directory number (DN) as the service key for a particular set of subscription data. The service key corresponds to the ANC number dialed (for example NPA-NXX-XXXX, where NXX is dedicated to the ANC system) and is used to access subscription data. Because a single local access transport area (LATA) can encompass more than one NPA (area code), the SCP 46 should be prepared to receive different NPAs in association with the NXX-XXXX number in the service key.

Subscription data for individual subscribers, however, is set up on a per LATA basis. Thus, the SCP 46 must use the LATA identification (ID) in the TCAP query in conjunction with the dedicated NXX-XXXX number in the service key of the TCAP query to determine the subscription data that is applicable. By setting up subscriptions on a LATA basis and using the three digit LATA identification (ID) along with the dedicated NXX as the service key to access subscriber data, the NPA of the calling party number is irrelevant. As a result, when a LATA encompasses more than one NPA (area code) and when a dedicated NXX number is used, two service keys do not have to be assigned to a subscription identifier as would be required if the service key used the NPA in combination with the dedicated NXX as the service key.

The SCP 46 is implemented by two finite state machines. The first finite state machine receives the incoming TCAP query. The first finite state machine derives a subscription identifier from the LATA identification (ID) and the service key. The first finite state machine sends the subscription identifier to the second finite state machine to be used as a "pointer" to the appropriate subscriber data set for the LATA which matches the LATA of the caller. The second finite state machine processes queries and performs the main ANC logic.

If the caller's location should be designated by a wire center, then the service control point (SCP) 46 uses the NPA-NXX of the calling party number to identify the caller's wire center. In some cases the SCP uses the NPA-NXX-X of the calling party number to uniquely identify the caller's wire center if the NXX of the calling number is split between wire centers.

Figure 2:
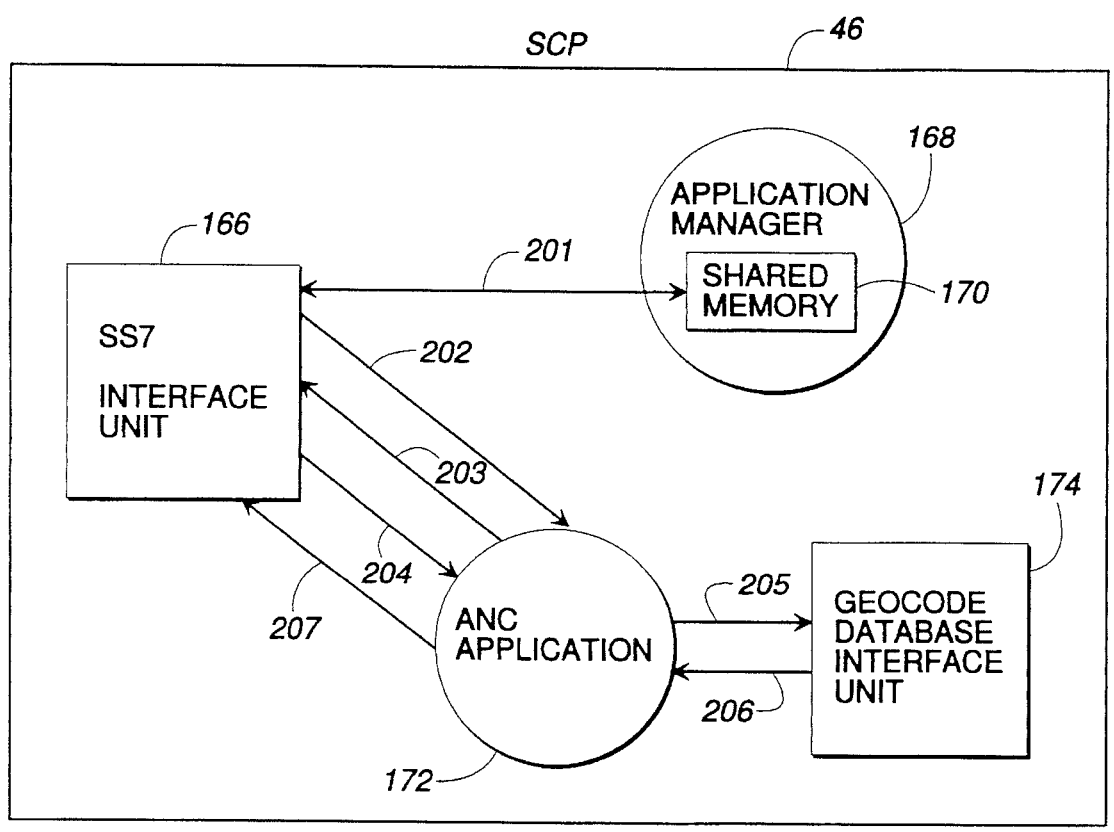
FIG. 2 illustrates the ANC query processes of the ANC subsystems.

FIG. 2 shows the ANC query process at the (SCP) 46. An incoming query from a service switching point enters the SCP computer via the SS7 interface unit 166. The SS7 interface unit 166 performs message transfer part and signal connection control part (SCCP) parsing of the message as known in to those skilled in the art and extracts the service key parameter. The SS7 interface unit 166 then invokes an application manager 168 library routine which accesses tables in a shared memory segment manager 170, as shown by arrow number 201.

The application manager 168 subroutine determines the nature of the service requested (ANC or other customer service). Particularly, the application manager 168 subroutine determines to which ANC application 172 the query should be routed based on the signal connection control part (SCCP) subsystem number (SSN). The SS7 interface unit 166 sends the query to the ANC 172 as determined by application manager 168 using message handler functions, as shown by message number 202. The incoming query from the SS7 interface unit 166 is received by the ANC application 172.

With continuing reference to FIG. 2, the ANC application 172, on receiving the record for the incoming query, processes the query according to the ANC feature logic discussed below. If the calling party number is not available in the query, it may be necessary to send a prompt and collect conversation message back to the triggering service switching point (SSP) 42 (FIG. 1) and receive the collected digits in response. In this case, the ANC application 172 will send a prompt and collect command to the SS7 interface unit 166 as shown by message 203, the SS7 interface unit 166 will in turn send a formatted transactions capabilities application part (TCAP) conversation message with signal connection control part (SCCP) and message transfer part headers appended and route the message to the triggering signal switching point (SSP) 42 over the SS7 network 45 (FIG. 1).

Upon receiving a response, the SS7 interface unit 166 extracts the transaction identification from the response to determine which ANC application 172 should process the message without invoking application manager 168 again. The SS7 interface unit 166 then forwards the transactions capabilities application part (TCAP) message to the ANC application 172, as shown by message number 204. If the calling party number is present in the original query, messages 203 and 204 are not required.

If the ANC subscriber for this particular query has chosen to use geographic routing by block group, the calling party number must be translated into a block group number as discussed below. This translation is performed by the geocode database interface unit 174. The ANC application 172 will send a geocode (block group) lookup action record to the geocode database interface unit 174, as shown by message 205. The geocode database interface unit 174 performs the translation and returns the block group number to the ANC application 172, as shown by message number 206. If the subscriber has chosen to perform geographic routing by wire center, messages 205 and 206 are not required because the wire center database is part of ANC application 172.

If the subscriber has chosen non-geographic routing, messages 205 and 206 are not required because access to the geocode database is not needed. Thus, for nongeographic routing, only messages 201, 202, 203, 204 and 207 are necessary.

The ANC application 172 will then select the subscriber destination to which the call should be routed according to the ANC feature logic and subscriber data. The ANC application 172 will format and send a transactions capabilities application part (TCAP) response message back to the SS7 interface unit 166 containing the directory number (DN) of this subscriber location, such as location 49 (FIG. 1), and billing indicators, as shown by message number 207. The SS7 interface unit 166 will add signal connection control part and message transfer part headers, send the response message to the triggering service switching point (SSP) 42 (FIG. 1), and end the transaction.

The geocode database illustrated in FIG. 2 has each calling party number in the telephone company's region assigned to the block group in which it is located. The geocode database (which has 10-digit telephone numbers assigned to the 9-digit block groups in which they reside) is established before ANC is provided to a subscriber. The master copy of the geocode database for the entire region is located at the service management system (SMS) 48 (FIG. 1 ). SMS 48 sends to the SCP 46 the portion of geocode database that corresponds to the NPA-NXXs within the LATAs that the SCP 46 serves, where ANC is provided.

The tables required for a wire center routing translation are of moderate size and can be maintained within the ANC application 172 at the service control point (SCP) 46. Block group routing, however, requires full 10 digit analysis of the calling party number, and results in tables with millions of records. For this reason, the translation of calling party number to block group is not performed in the ANC application 172 in the service control point (SCP) 46. Thus, a separate geocode database interface unit 174 is utilized. The geocode database interface unit 174 quickly translates a 10-digit calling party number into a block group number for a database which may consist of 3 to 19 million records. For storage and performance efficiency, the block group identifier and wire center identifier presented from the service management system (SMS) 48 to the ANC application 172 at the service control point (SCP) 46 are compressed forms of the Census Bureau block group and CLLI code respectively. For both items, the compressed form is a number in the range of a 4 byte integer. The geocode database subsystem in the service management system (SMS) 48 also contains the functionality to backup, restore, audit, and otherwise maintain this database.

As indicated above, the present invention allows subscribers with multiple locations to advertise one telephone number for the multiple locations. Calls to that number are routed to a subscriber designated location based on subscriber selected parameters such as geographic location, day of week, time of call, or percent distribution. In order to provide an allocation scheme for routing based on geographic location, the subscribers assign geographic regions to business locations that conform to wire centers or block group boundaries.

As noted above, an advantage of the present invention is the granularity of block group routing. Block groups are defined by the Census Bureau and typically encompass a much smaller geographic area than a wire center area. This gives an ANC subscriber a greater degree of specificity in determining which caller in which geographic areas should be routed to which subscriber locations. Block group routing is especially important for those businesses that have multiple locations within a single wire center area, making wire center routing insufficient for getting callers to the most appropriate subscriber 49 location (FIG. 1).

In accordance with the present invention, a map of the area in which subscriber locations reside is provided to a subscriber. The subscriber assigns each geocode (block group or wire center) within the subscriber's service area to a particular subscriber location by designating or defining regions on the map. The resulting map is referred to as a region set. A particular region usually corresponds to a particular subscriber location. A subscriber may specify more than one region set. The subscriber maps or region sets are stored in the service management system (SMS) 48 (FIG. 1) and data derived from the region sets is sent as required to the service control point (SCP) 46. Regions are composed of one of more block groups and/or wire centers. Thus, each subscriber map (region set) is basically a file of regions, where each region is a list of block groups and/or wire centers. When the regions on these multiple subscriber region sets are overlaid, sections can be formed. A section represents the largest subset of block groups and/or wire centers that are always routed as a unit regardless of which subscriber map is considered.

Figure 3A:
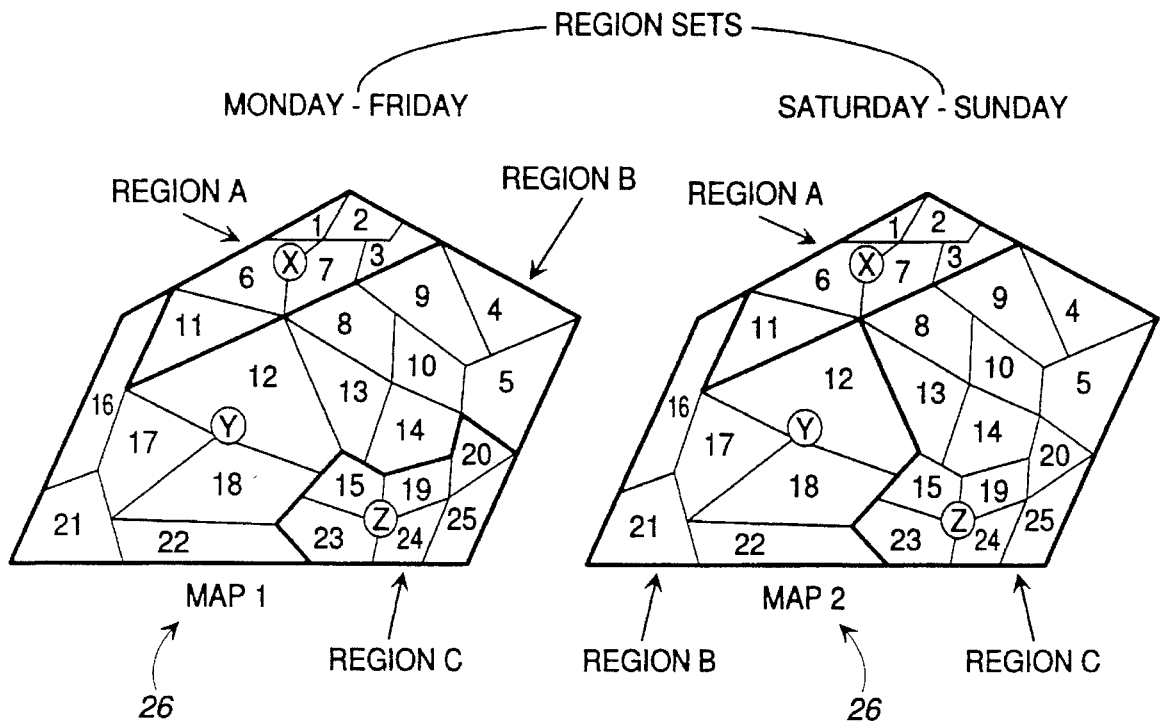
FIG. 3a illustrates subscriber region sets and corresponding data tables.

Referring to FIG. 3a, a subscriber's area of service is represented by each of the pentagon shaped figures that encompass the smaller areas identified by the numbers 1–25. Within the subscriber's area of service, geographic areas 1–25 may be defined as wire centers (the area defined by the telephone company), block groups (the area defined by census data) or other type of geographic area, depending on the type of routing selected. In FIG. 3a mapping is done by block groups by way of example. The geographic representation of the subscriber's area of service with each block group assigned to a region and therefore a particular subscriber location is referred to as a map. Generally maps are represented as data tables, for example, table 1 or table 2 in FIG. 3a. The subscriber can have one or more maps as part of the present invention. A map is considered "active" during a particular interval of time (e.g., weekday map, weekend map, etc.). A subscriber may divide each map into regions such as A, B or C. As illustrated, for example, a map 1 (a region set) may be divided into regions A, B, and C, and a map 2 may be divided into another set of regions A, B, and C. A map which is divided into regions is referred to as a region set 26. By dividing the map into regions, the subscriber is designating the particular subscriber locations (X, Y or Z) that should receive calls from the various block groups or wire centers located within each region. A region is composed of one or more block groups, wire centers or both.

By way of example, map 1 has been defined as Monday through Friday, and map 2 has been defined as Saturday through Sunday. The Monday through Friday region set (map 1) has been divided into A, B, and C regions. The Saturday through Sunday region set (map 2) has been divided into another set of A, B, and C regions. Calls from each of the regions will be routed to a subscriber location, such as X, Y, and Z selected as serving the particular region from which the call originated based upon the time when the call is received based on time of day and active map.

For each region set 26, the block groups within the subscriber's area of service are assigned to a particular subscriber location based upon the region. Therefore, a different set of geographic data, corresponding to block groups per region, would be created for each region set 26, increasing the amount of data that must be accessed and also stored in order to determine a particular subscriber location. Because thousands of the more granular block group geographic areas could be assigned to each map, vast amounts of data must be accessed and processed within a relatively short time period.

The amount of data, due to block group mapping of calling party numbers and/or providing multiple region sets (maps), increases in large cities or in areas with thousands of block groups to be assigned for a given area of service. Also, in highly populated areas, the number of subscribers or vendors that will use the service further provides a factor of multiplication of data that affects overall storage. With such vast amount of data to be stored for any given area which a telephone company services, providing the granular block group routing becomes problematic due to storage and time constraints. For example, the access time needed to sort through such large quantities of data may cause unacceptable delays in the processing of telephone calls to a particular subscriber's service.

Figure 3B:
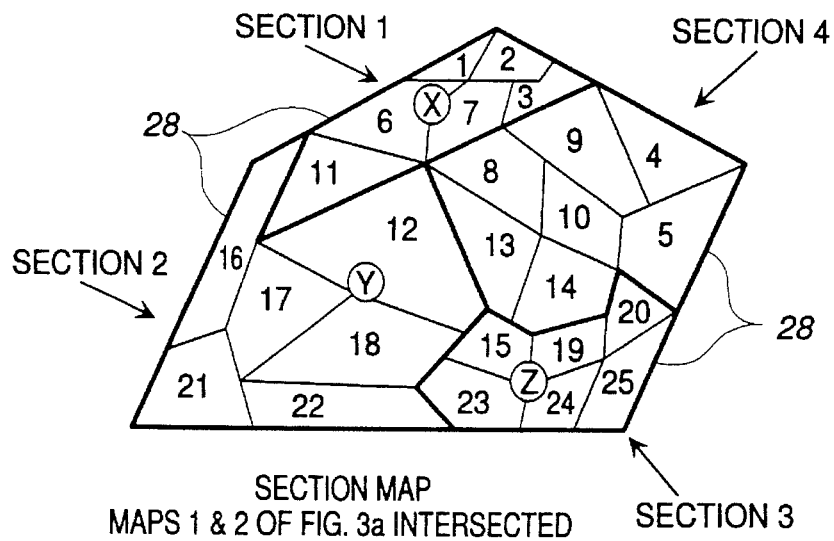
FIG. 3b illustrates map compression and subscriber data tables.

The present invention provides a method in which calls may be routed based upon block groups and multiple maps by reducing the amount of data stored at the service control point (SCP) 46 (FIG. 1). Referring to FIG. 3b, data reduction is possible by creating sections 28 for the maps. Sections are formed by intersecting the regions from all region sets 26 (FIG. 3a) in a subscription. Sections may be visualized by first considering each of the region sets 26 of FIG. 3a to be drawn on transparencies. Next, visualize stacking the transparencies with the region sets perimeters aligned. As illustrated is FIG. 3b, the resulting image created by the intersecting region divisions forms the set of sections. Sections 28 may be individually identified, for example, as section 1, section 2, section 3 and section 4. The geographic area for a section is consistent across all of a particular subscriber's maps, whereas a region differs from one map to the next. A section is composed of one or more block groups or wire centers, and it is typically smaller than a region. It should be appreciated that more maps, regions, and sections may be defined and may have contours different than shown in the illustrated embodiment. The illustrated embodiment is provided only as an example.

Referring again to FIG. 3a, two maps of a particular subscriber are shown, each map representing a different partitioning of regions depending on the day of the week. Maps 1 and 2 show a partitioning of the regions designating which block groups 1–25 should be routed to the subscriber locations X, Y or Z. Table 1 represents a function which translates a block group (BG) to a region (R) for map 1 which is active Monday through Friday. For example, table 1 translates: block group 1 into region A, calls from block group 1 are routed to subscriber location X; block group 10 into region B, calls from block group 10 are routed to subscriber location Y; block group 25 into region C, calls from block group 25 are routed to subscriber location Z. Table 2 represents the function which translates a block group to a region for map 2 which is active Saturday through Sunday. For example, table 2 translates: block group 1 into region A, calls from block group 1 are routed to subscriber location X (as was the case with map 1); block group 10 into region C, calls from block group 10 are routed to subscriber location Z (for map 1 those calls were routed to location Y); block group 25 into region C, calls from block group 25 are routed to subscriber location Z (as was the case with map 1). As shown in FIG. 3a, twenty-five assignments of block groups to regions are required for each map thus yielding fifty total assignments for the subscriber's region sets. If the subscriber chose to route the block groups or partition the regions differently for each day of the week, then 175 (25 block groups×7 days) assignments of block groups to regions would be required. In large metropolitan areas, with thousand of block group areas, the amount of data that must be stored and accessed is substantially increased for subscribers having multiple maps.

FIG. 3b illustrates, by way of example, the method in which the multiple map data may be overlaid or intersected to determine sections which are consistently or commonly grouped for routing across all of a particular subscriber's maps. The section map translates block groups to consistently routed sections as illustrated. As can be seen from the table 3 which corresponds to the section map, block group 1, 16, 25, and 4 correlate respectively to sections 1, 2, 3, and 4. To complete the encoding of block groups to regions of maps 1 and 2 of FIG. 3a, the sections are translated into the proper regions. To translate the sections to regions, a section-to-region table is defined for each of the maps 1 and 2. Table 4 implements the following assignment: section 1 to region A, section 2 to region B, section 3 to region C, and section 4 to region B. Table 4 is utilized for the subscriber in the example for Monday through Friday. Table 5 implements the following section to region assignment: section 1 to region A, section 2 to region B, section 3 to region C, and section 4 to region C. The table 5 assignments are used in the example for Saturday through Sunday calls.

As shown in FIG. 3a, the data tables, table 1 and table 2, map the block groups in a region set directly to a region without using the intermediate section variable.

As noted above, fifty total assignments of block groups (BG) to regions (R) are utilized for routing, whereas as shown in FIG. 3b one table containing 25 assignments of block groups to sections and two tables containing 4 assignments, having a total of 33 assignments are utilized for routing. With direct mapping of block groups to regions, a separate table repeating each block group is required for each subscriber map. However, when implementing sections, one block group assignment is utilized. As shown in this simple example, the section variables provide storage efficiency because less data is stored (thirty three assignments instead of fifty) for call routing. With thousands of block groups, direct mapping can create storage problems.

The difference between the data stored using direct mapping as compared to section mapping increases with a high ratio of block groups to sections and also as the number of subscriber maps increase. For example, if we assume there are 5000 block groups, 500 sections, and 100 regions in the subscriber's area of service (AOS) and 16 region sets are used, then using sections results in (5000+500* 16)=13,000 records or assignments, while a direct map results in (5000*16)=80,000 records or assignments. When using direct mapping once the block group from which the call originated is determined the region to which the block group is assigned is determined by using one table. However, when utilizing sections two tables are utilized to determine the region to which a block groups is assigned—first, the table assigning the block groups to sections is implemented, then the table assigning sections to regions is implemented.

Figure 4:
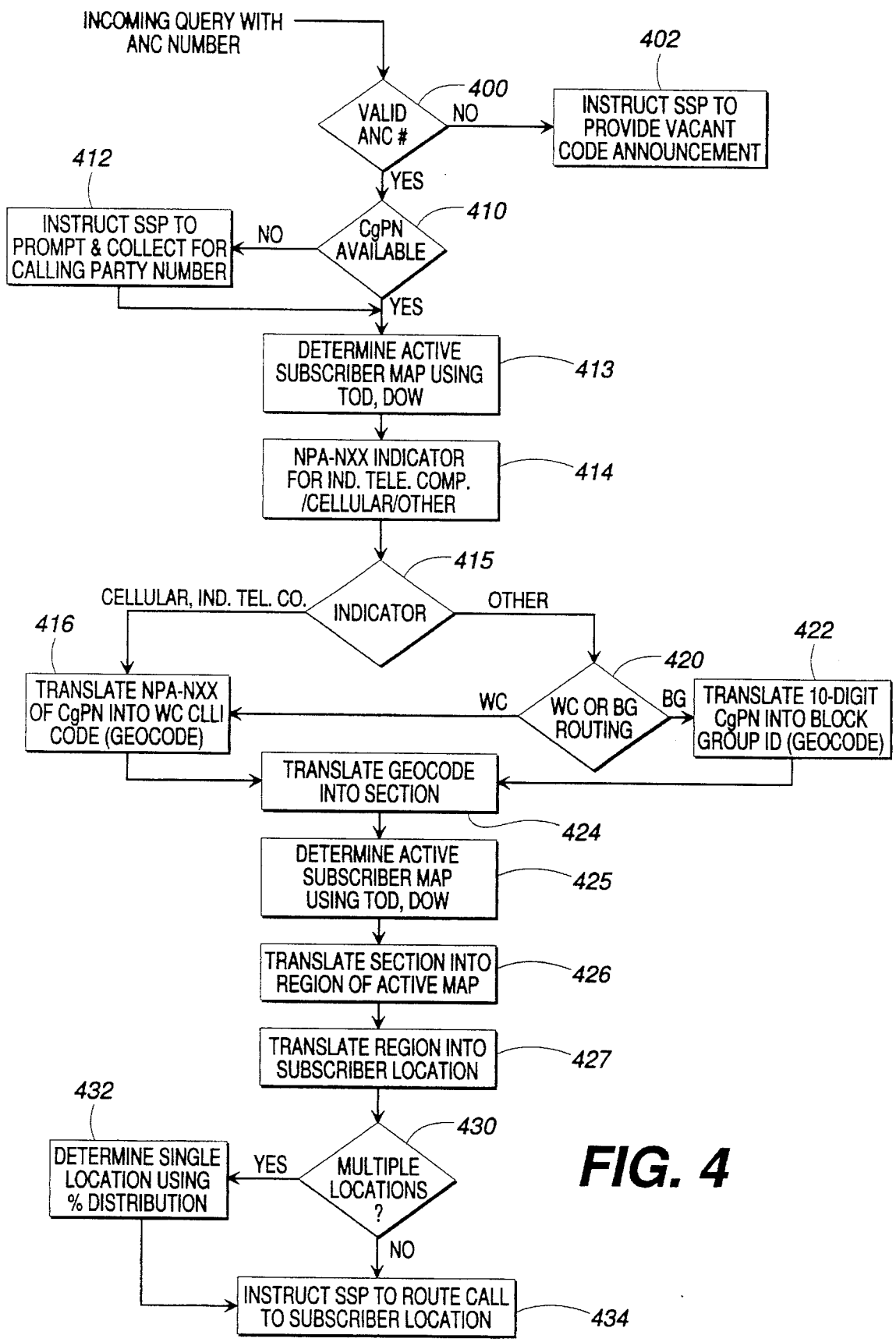
FIG. 4 illustrates the general processing and logic followed for an ANC call.

Referring to FIG. 4, a flow diagram illustrates the general processing and logic followed for an ANC call at the service control point (SCP) 46 (FIG. 1). At step 400, the SCP 46 determines whether the number received is a valid ANC number. If the number is not a valid ANC number then at step 402 the service control point (SCP) instructs the service switching point (SSP) 42 (FIG. 1) to provide a vacant code announcement. If at step 400 the number dialed was a valid ANC number, then at step 410 the query is evaluated to determine if the calling party number is available. If the calling party number is not available then at step 412 the SCP 46 instructs the SSP 42 to prompt and collect a calling party number from the caller. After successfully collecting the calling party number, the process then proceeds to step 413 to determine which of the subscriber's maps is currently active. An internal clock associated with the SCP 46 is used in conjunction with software to determine the active map. After the active subscriber map has been determined, at step 414 the NPA-NXX of the calling party number is evaluated to determine if it is associated with an independent telephone company, a cellular carrier, or other. If the indicator specifies either cellular or ITC at step 415, then wire center routing is applicable, and at step 416 the NPA-NXX of the CgPN is translated into the wire center representation.

At step 415 if the indicator specifies other then the subscriber data is evaluated at step 420 to determine whether WC or BG routing has been chosen by the ANC subscriber.

If wire center routing has been chosen then at step 415 the NPA-NXX of the calling party number is translated by the SCP 46 into a wire center representation. If however at step 420 the subscriber has chosen block group routing, then at step 422 the 10-digit calling party number is translated into a block group identification number (ID). The wire center code or block group ID is a geographic code which is termed a geocode. After the appropriate geocode has been determined the geocode is translated into a map section at step 424. At step 426 the section is translated into a region of the active map. At step 427 the region is translated into the appropriate subscriber location.

At step 430, if the subscriber has designated multiple locations that may receive calls originated from a particular geographic area, then at step 432 a single location is determined using the percent of distribution of calls designated by the subscriber for a given time period. For example, a subscriber may specify that calls from an area are to be distributed to three subscriber locations according to a 50%, 30%, and 20% apportionment. When the single location has been determined at step 434, the service control point (SCP) 46 instructs the service switching point (SSP) 42 to route the call to the subscriber location. However, if at step 430 the subscriber has not designated multiple locations that may receive the call from the originating location then the SCP 46 instructs the SSP 42 to route the call to the single subscriber location designated.

Figure 5:
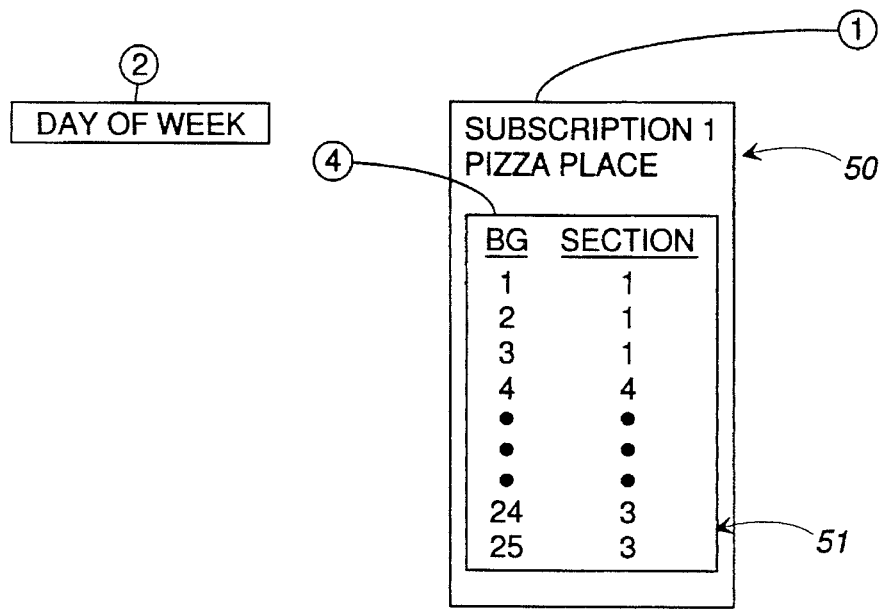
FIG. 5 are translation tables used to determine a subscriber location.
Figure 5:
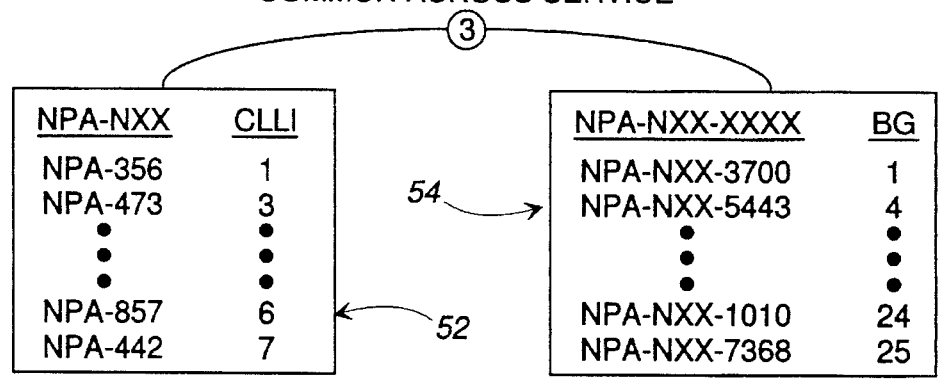
Figure 5:
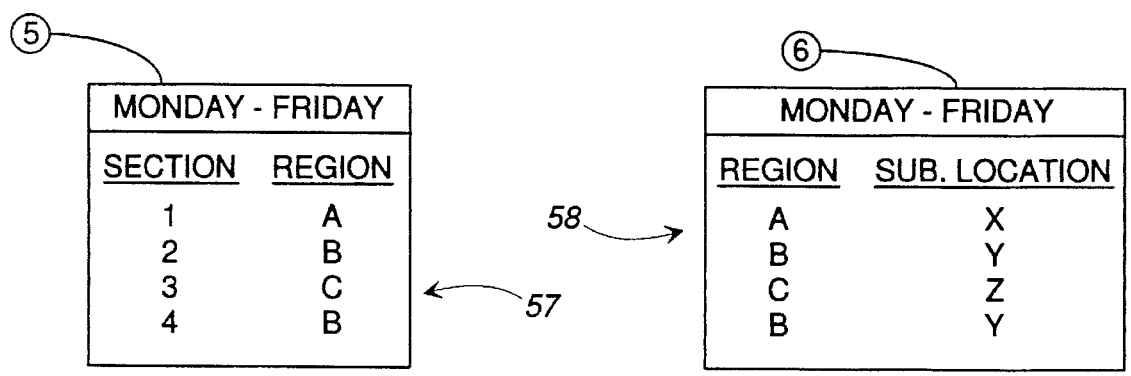

Referring to FIG. 5, a more detailed illustration of the translation tables at the service control point (SCP) 46 are shown. The subscriber data and translation tables are used to identify the subscriber location that should receive a call from a particular geographic area as discussed above. The encircled numbers one through five indicate the steps or the order of processing and translation of data utilized in routing a call. When an ANC number is dialed, the ANC number identifies a subscriber and consequently the subscription data that should be accessed. For example, at step 1, the Pizza Place subscription data 50 is accessed. As shown in the diagram, the Pizza Place subscriber has chosen block group (BG) routing for subscribers within its area of service. Because block group routing has been chosen the calling party's entire number, NPA-NXX-XXXX, will be used to identify the block group from which the call originated. At step 2, the subscriber's active map or region set is determined depending upon the time of day or day of week for example as illustrated. At step 3, a table 52, is provided that assigns the NPA-NXXs to wire centers and a table 54 assigns NPA-NXX-XXXXs to block groups (BG).

Because the geographic area of the originating line does not change depending upon the particular subscriber called, the tables which contain the assignments of the wire centers codes and block group codes to originating line telephone numbers are the same for all subscribers. Calls from cellular phones will be assigned to a specific wire center as discussed below. Because the Pizza Place has chosen block group routing, the block group associated with the calling party number is retrieved from the block group data table 54. After the block group from which the call originated has been determined according to table 54, the section which corresponds to the block group is determined, as indicated at step 4. After the section determination has been made, the section is translated, according to table 57, into the appropriate region for the active map at step 5. At step 6, after the appropriate region has been selected, the region is translated into a particular subscriber location according to the table 58.

As discussed above, the geocode database assigns each calling party number to a wire center and/or a block group. The telephone service provider maintains the geocode database in the SMS 48 correlating telephone numbers to block groups and updates it daily to reflect service order activity. Thus, people signing up for new telephone service, people changing their telephone numbers, or people discontinuing telephone service are automatically accounted for in the geocode database through these daily updates. This alleviates the ANC subscriber of the responsibility of providing and maintaining a database to geographically locate its customers. For a large metropolitan area, the geocode database will contain between 2 and 3 million records, and several thousand updates to the geocode database per day can be expected.

If the subscriber has designated wire center routing or has independent telephone company (ITC) end offices within the subscriber's area of service (AOS), then the service control point (SCP) 46 receives a wire center table from the service management system (SMS) 48 that has representation of the wire centers in the subscriber's area of service assigned to a section. If the subscriber has designated block group routing, then the service control point (SCP) 46 receives a block group table from the SMS 48 that has the block group identifiers for the block groups within the subscriber's area of service assigned to a section. The tables are prepared by the SMS 48 at the time the ANC system is set up for a particular subscriber.

There are two types of feature logic used to implement the present invention within the service control point (SCP) 46, fixed logic and flexible logic. The fixed logic contains those elements of ANC which do not vary from subscriber to subscriber and is implemented by the SCP 46 in service logic language (SLL). The flexible logic contains those elements which can be customized on a per subscriber basis and may be implemented using decision graphs (DGs) provided to the SCP 46 from the SMS 48. Both types of feature logic are contained within the ANC application 172 in the service control point (SCP) 46 (FIGS. 1 and 2).

The present invention utilizes software subsystems at the SCP 46. These are the ANC application 172, and the geocode database 174. The ANC application 172 contains the query processing and measurement logic for the ANC system. The geocode database performs the translation of the calling party number into a block group number, which is used by the SCP 46 to identify the geographical area from which the call originated.

The service control point (SCP) 46 platform software handles the part of the ANC application 172 in the SCP 46 that interfaces with the Signaling System 7 data link's interface unit 166 and the geocode database interface unit 174 during real time query processing as illustrated in FIG. 2.

Figure 6:
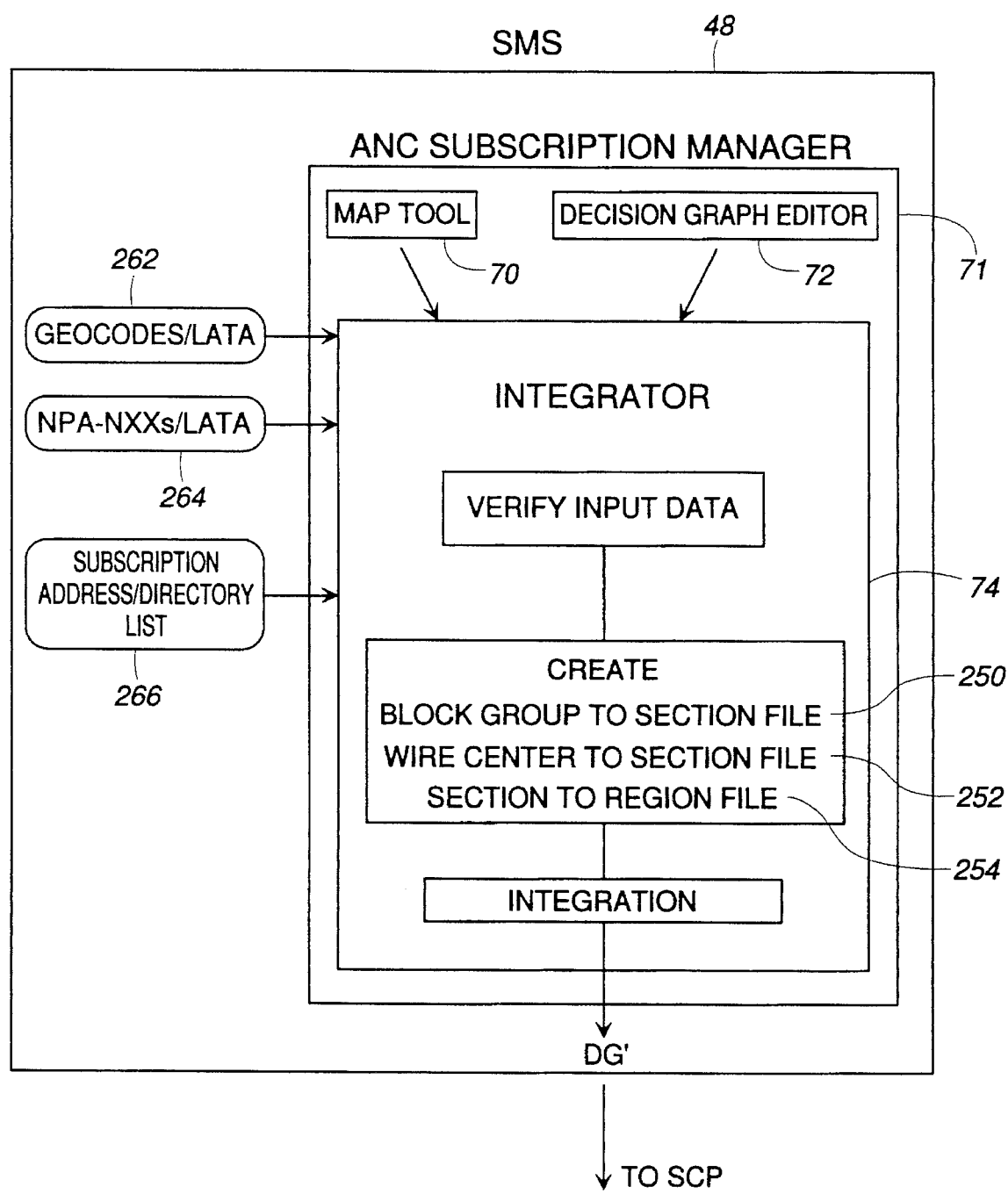
FIG. 6 is a block diagram of a subscription manager containing a file integrator.

In order to provide the ANC system, the SCP 46 must have access to the subscription parameters and the geocode data. Such data is made available to the SCP 46 by means of the SMS 48. The SMS 48 manages subscription data which contains recent change (RC) and decision graph data (including map tables). SMS creates subscription data by means of an ANC subscription manager, map tool and decision graph editor. Referring to FIG. 6, the decision graph files (DG') are produced by a decision graph editor (DGE) 72. Map files are created by the map tool 70. Because these are separate tools which produce different data formats, a third tool, an integrator 74, is used to check and combine their outputs to form the final decision graphs (DG').

In setting up ANC for subscribers, a subscriber, or an agent for the subscriber, enters the recent change data and the map data. Tables 1 and 2 in FIG. 3a are produced by the map tool 70. Tables 3, 4 and 5 in FIG. 3b are produced by the integrator. The subscriber also enters the time of day, day of week, and the names of the region sets into the decision graph editor. Once both types of information have been entered and passed to the integrator 74, the integrator checks the information for consistency and formats it appropriately for the ANC application 172 running on the service control point (SCP) 46.

The geographic areas and region sets submitted by a subscriber which designates regions to particular subscriber locations are digitized or input into a service management system (SMS) 48 workstation through the use of the map tool. The map tool uses the commercially available geographic information system ARC/INFO software known to those skilled in the art to create and modify region sets and regions.

The map tool serves two primary functions. First, the map tool is used for inputting subscriber locations and region sets 26 (FIG. 3a) delineated on paper maps, and to produce region files in the form of block group/wire center tables. These region files are associated with a particular ANC subscription stored on the SMS. Block group data refers to U.S. Department of Commerce, Bureau of the Census, digital map data for street block boundaries and other natural boundaries, as discussed above.

It may be difficult to use the map tool to create the region files in the form of tables and use the decision graph editor tool to produce routing instructions and then coordinate the data at the SCP 46 with the ANC application 172. The decision graph (DG) from the decision graph editor 72 and map data produced by the map tool 70 are in different formats. The decision graph (DG) is in an ASCII format and the map data is in the form of tables. The integrator 74 accepts the region files and decision graph (DG) to create map tables which are integrated into the decision graph to produce the final decision graphs (DG'). FIG. 6 shows a general block diagram of an area number calling subscription manager 71 incorporated into the service management system (SMS) 48. Region files of various maps output from the map tool 70 and decision graph files with map nodes output from the decision graph editor/verifier 72 are input into the integrator 74 which creates a decision graph file (DG') that is downloaded as part of the subscription data to the service control point (SCP) 46.

The integrator 74 takes the decision graph (DG) and region files as shown in FIG. 6 and performs a validation of the geographic routing information, the region files, entered through the map tool 70 and decision graph (DG) entered through the decision graph editor 72. The integrator 74 generates geocode to section tables (block group to section table 250 and/or wire center table 252) and section to region tables 254 and then integrates them into the decision graphs (DG') at the appropriate nodes. The SMS 48 also converts from 12 to 9 digit block groups. The output of the integrator is a final decision graph (DG') which contains original decision graph data and region files. The subscription manager 71 encapsulates the output of the integrator 74 and recent change data and sends the encapsulated data to the service control point (SCP) 46 for utilization as discussed in conjunction with FIGS. 1–6.

In addition, the integrator 74 supports the following functions: internal validation of the original decision graph data and map data; cross validation of the original decision graph data and region files; creation of block group to section, wire center to section and section to region tables; and integration of these tables into the original decision graph other parts of the SMS 48 provide block group conversion from 12 digits to 9 digits and wire center ID conversion from 8 characters to 9 digits.

In addition to the outputs from the map tool 70 and decision graph editor 72, the integrator 74 also has inputs 262, 264, and 266 described below.

Input 262 is Valid Geocode Translations (List(s) of valid geocodes). The Valid Geocode Translations input 262 specifies when geocodes (block group identifiers, wire center identifiers, or independent telephone company identifiers) are valid for that LATA and hence for that subscription. This information is specified in one or more text files. Each file has two columns, the first listing the actual geocodes as generated by the mapping tools. The second column provides the translation of the corresponding entry in the first column.

Input 264 is Valid NPA-NXX List (List of valid NPA-NXX combinations for subscribers). Input 264 is a per-LATA list of valid NPA-NXX combinations. Any destination (subscriber) number that appears in the subscription's decision graph must have a NPA-NXX from this list.

Input 266 is a subscription address/DN list which is a list of the subscriber's location and telephone numbers. The subscription address/DN list is used in connection with validation of data in integrator 74.

In connection with the generation of the final decision graph (DG'), the integrator evaluates each geocode and determines which regions and region sets are associated with it. As sections are derived, they are assigned identifying serial numbers starting at 1. The sections are derived depending on: the order that region sets are first encountered in the decision graph; the order that region files are found in a region set directory; the order of the geocodes listed in the per-LATA valid geocode lists; and the number and arrangement of the derived sections.

The following algorithm defines one method of constructing sets of geographic codes-to-section and section-to-region tables for an arbitrary number of mappings. The algorithm is described with the help of FIG. 7 through FIG. 8c, and Table 6 through Table 12.

Definitions and Input

The following definitions represent input data to the compression process.

Let SA={gc:} {gc} is a geographic area in a Service Area)
FIG. 3 shows an SA={1, 2, ... 12}.

Let R ={r: r is a Region identifier} m In FIG. 7, Regions are defined as A, B, C, D, and Ø, where Ø is defined as nil (that is, no Region).

Let Map={gc, r}: gc is an element of SA and r is an element of R and $gc_i \neq gc_j$—For example, in FIG. 7, Map1= {(1, A), (2, A), 3, Ø), (4, B) ... (12, B)}. Note that (1, A) and (1, B) could not both be an element of Map since $gc_i = gc_j$ in this case. The Maps are also called a "Region Set".

Let MapSet be the set of all maps to be compressed. That is, MapSet={Map 1, Map2, ... $Map_n$}.

Algorithm

Let IR={(gc, RS, s); gc is an element of SA, RS is a subset of R, and s is a Section identifier}

Define f(RS) as a function which accepts a set, RS, as an argument and returns a unique Section identifier, s, for the set. Sets with the same elements return the same identifier. For example:

1=f({A})
2=f({A,B})
3=f({A,C})
4=T({B})
5=f({D})
6=f({A,D})
7=f({C})
8=/({Ø})
3=f({A,C})

Note that although this example shows sequential numbering, this is not a requirement.

Let BTS={(gc, s): gc is an element of SA and s is a Section identifier}

Let SR={(s,r): s is a Section identifier and r is an element of R}

Construct Set IR as follows:

```
||Construct IR
For each Map_i in MapSet {
  For each (gcj, r_j) in Map_i {
    If Map_i is the first map to process {
      construct an element of IR (gc_j, RS_j, S_j)
      IR.gc_j = Map.gc_j       ||Assign geographic area
    }
    Insert r_j into RS         ||Add Region Id
    If (Map_i is the last Map to process)
      s_j = f(RS_j)            ||Compute Section Identifier
{ }
```

At this point in the algorithm, example tables Table 6, Table 8, and Table 10 represent IR for 1, 2, and 3 maps, respectively. The BTS is easily derived from IR as follows:

```
||Construct BTS
For each (gc_i, RS_i, s_i in IR {
  Construct an element of BTS, (gc,s), as follows:
    gc = gc           ||Assign Geographic Area
    s = s_i           ||Assign Section Identifier
}
```

At this point in the algorithm, example tables Table 7, Table 9, and Table 11 represent Block Group-To-Section (BTS) sets for 1, 2, 3 maps respectively. In addition, one SR set must be constructed for each Map:

```
||Construct SR
For each Map_i in MapSet {
  [1]  Construct all elements (s_j,r) of SR_i, where s_j is
       unique and is equal to s of some BTS element (gc,s) and all
       values of s in BTS are represented
  [2]  For each (s_j, r_j) in SR_i {
         r_j = r where (gc,r) is in Map_i and (gc,s_j) is in BTS
       }
}
```

At this point in the algorithm, example tables FIG. 8a, FIG. 8b, and FIG. 8c represent Section-to-Region (S) sets for 1, 2, and 3 maps, respectively. Refer to FIG. 7 and 8c for the following explanation. Statement [1] in the algorithm causes eight SR tuples to be created. After statement [1] is executed, tuples for $SR_1$, $SR_2$, $SR_3$, are the same. For example, SR1={(1,$r_1$), (2,$r_2$), (3,$r_3$), (4,$r_4$), (5,$r_5$), (6,$r_6$), (7,$r_7$)(8, $r_8$)} after statement [1]. Statement [2] finds some combination of BTS and $Map_i$ tuples such that $s_j$ implies r through transitivity. For instance, in $SR_1$, $s_1$=1 implies r=A because (1,1) is in BTS and (1,A) is Map 1, resulting in ($s_1$, $r_1$)=(1,A). One possible derivation of $SR_3$ follows:

| BTS | $MAP_3$ | | $SR_3$ |
|---|---|---|---|
| (gc,s), | (gc,r) | => | (s,r) |
| (1, 1), | (1,A) | => | (1,A) |
| (3,2), | (3,Ø) | => | (2,Ø) |
| (4,3), | (4,B) | => | (3,B) |
| (5,4), | (5,B) | => | (4,B) |
| (9,5), | (9,C) | => | (5,C) |
| (10,6), | (10,B) | => | (6,B) |
| (12,7), | (12,C) | => | (7,C) |
| (11,8), | (11,D) | => | (8,D) |

End of Algorithm

Summary of Algorithm

1. For each geographic code in a service area (SA), the algorithm provides an association between the geographic code, the union of all regions assigned to the geographic code across all maps in a MapSet, and a section identifier which uniquely identifies a set of regions assigned to any geographic code in a MapSet. (This association is IR and is not part of the final output.)

2. For each geographic code in a service area (SA), the algorithm provides an association between each geographic code and a section identifier which uniquely identifies a set of regions assigned to any geographic code in a MapSet. (This association is BTS and is part of the final output.)

3. For each map in a MapSet, the algorithm provides an association between a section identifier and the region implied by the section identifier for the particular map. (This association is one or more SRs and is part of the final output.)

While the section-to-region data structures are being created, the integrator 74 also checks that each geocode has been referenced by each region set. If not, the integrator 74 assigns it to the predefined default pseudo-region and issues a warning message for it. Consequently, the section is actually what is assigned to the default pseudo-region, not the individual geocodes.

The identifier for the cellular pseudo-region does not appear in section-to-region structures and the identifier for the default pseudo-region appears only if some region set has missed including at least one of the geocodes specified by another region set.

Figure 9A:
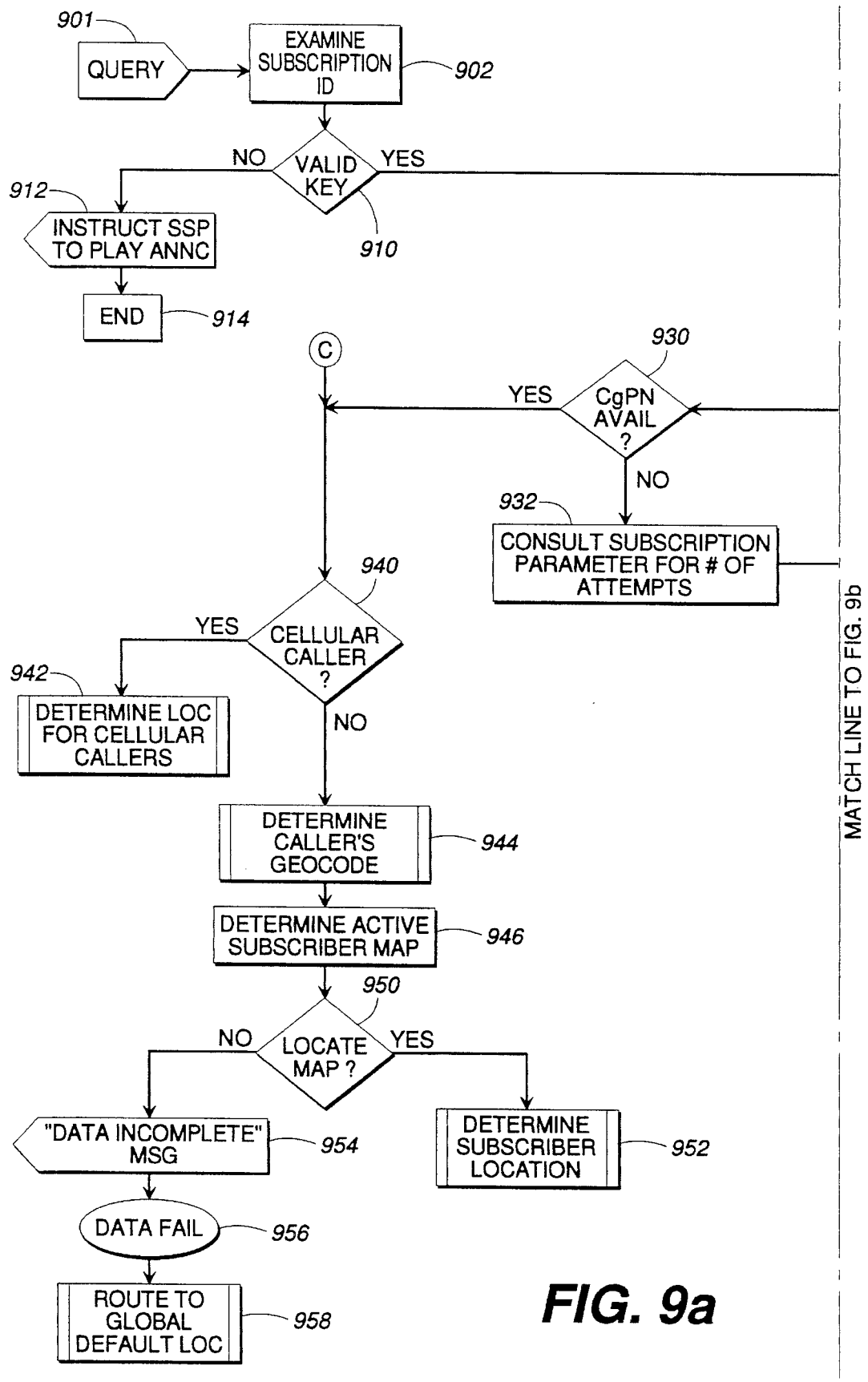
FIGS. 9a and 9b are flow diagrams of the ANC feature logic.
Figure 9B:
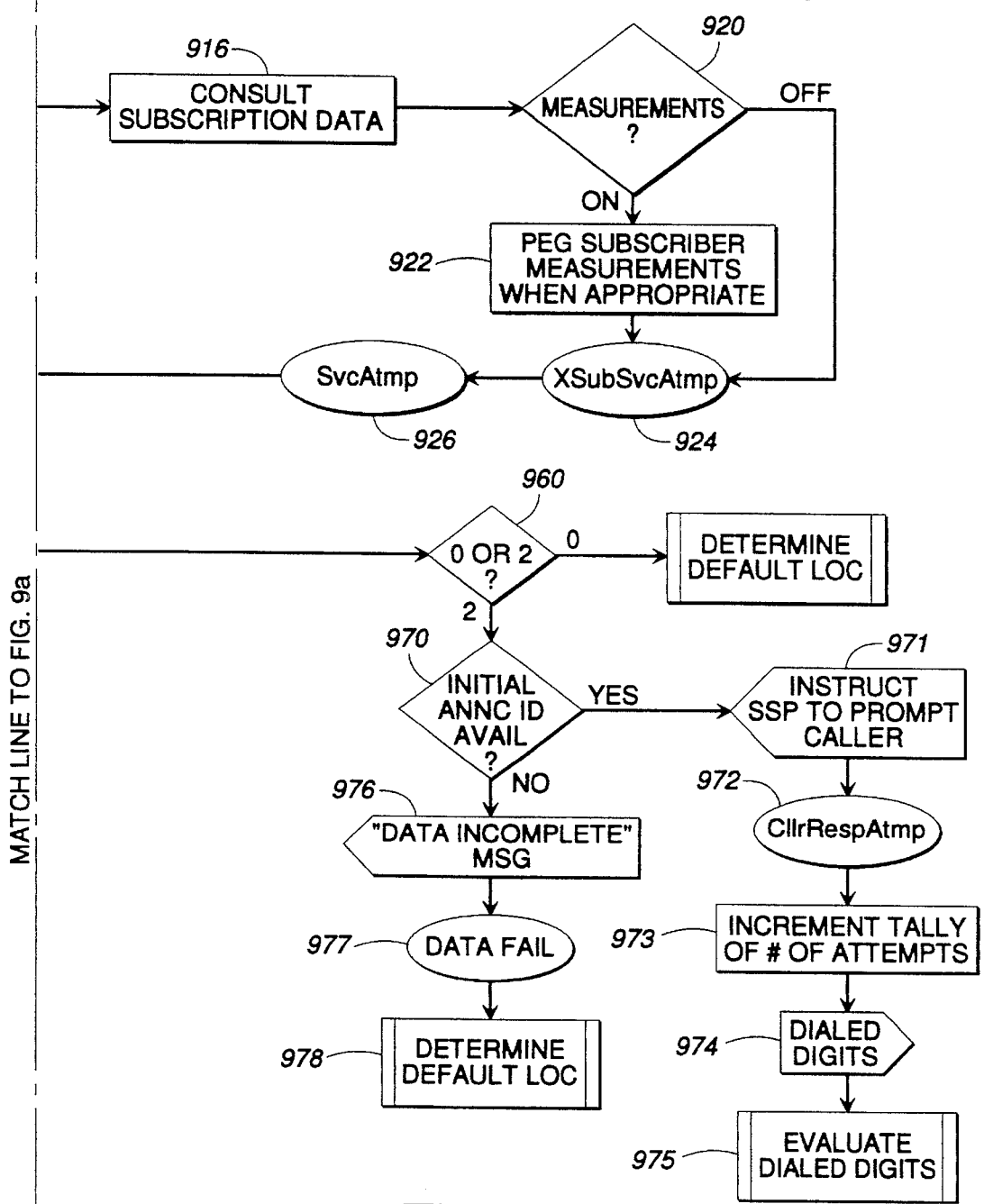

The logic of the ANC system may be examined by referring to FIG. 9, comprising FIGS. 9a and 9b. At step 901, a TCAP query is received by the SCP 46 from the SSP 42 (FIG. 1). At step 902, the SCP 46 examines the subscription identification derived from the query message and compares the service key to data in the application manager 168 (FIG. 2). At step 910, if the service key is not valid the SCP 46 instructs the SSP 42 to play an announcement. The call processing ends at step 914. However, at step 910, if a valid subscription identification was received, then at step 916 a subscriber's subscription data is retrieved including the subscriber's decision graph (DG').

At step 920, if the subscriber measurement feature is on then step 922 indicates that the subscriber measurements are incremented, and for each decision node FIGS. 9–16 identified by prefix "X sub" measurements are also taken. At step 924, a count is incremented representing the number of queries to the ANC application for a particular subscription, as indicated by the label XSubSvcAtmp. If, at step 920, the measurements feature is off, then the ANC logic follows the successive steps indicated without tallying subscriber measurements. At step 926, a count is incremented representing the number of queries received for the ANC application indicated by the label SvcAtmp.

Figure 10:
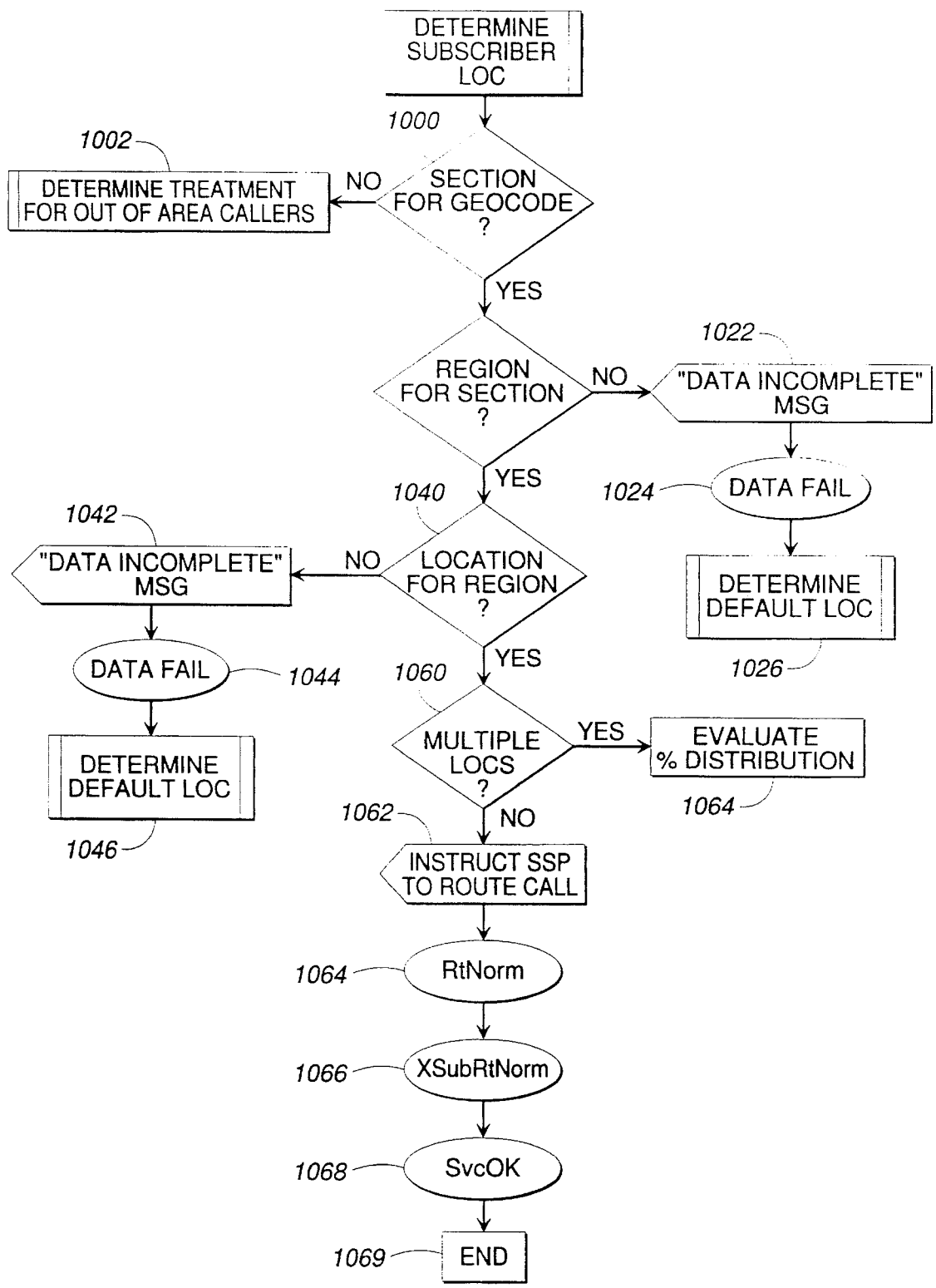
FIG. 10 is a flow diagram of the logic used to determine a subscriber location.
Figure 12:
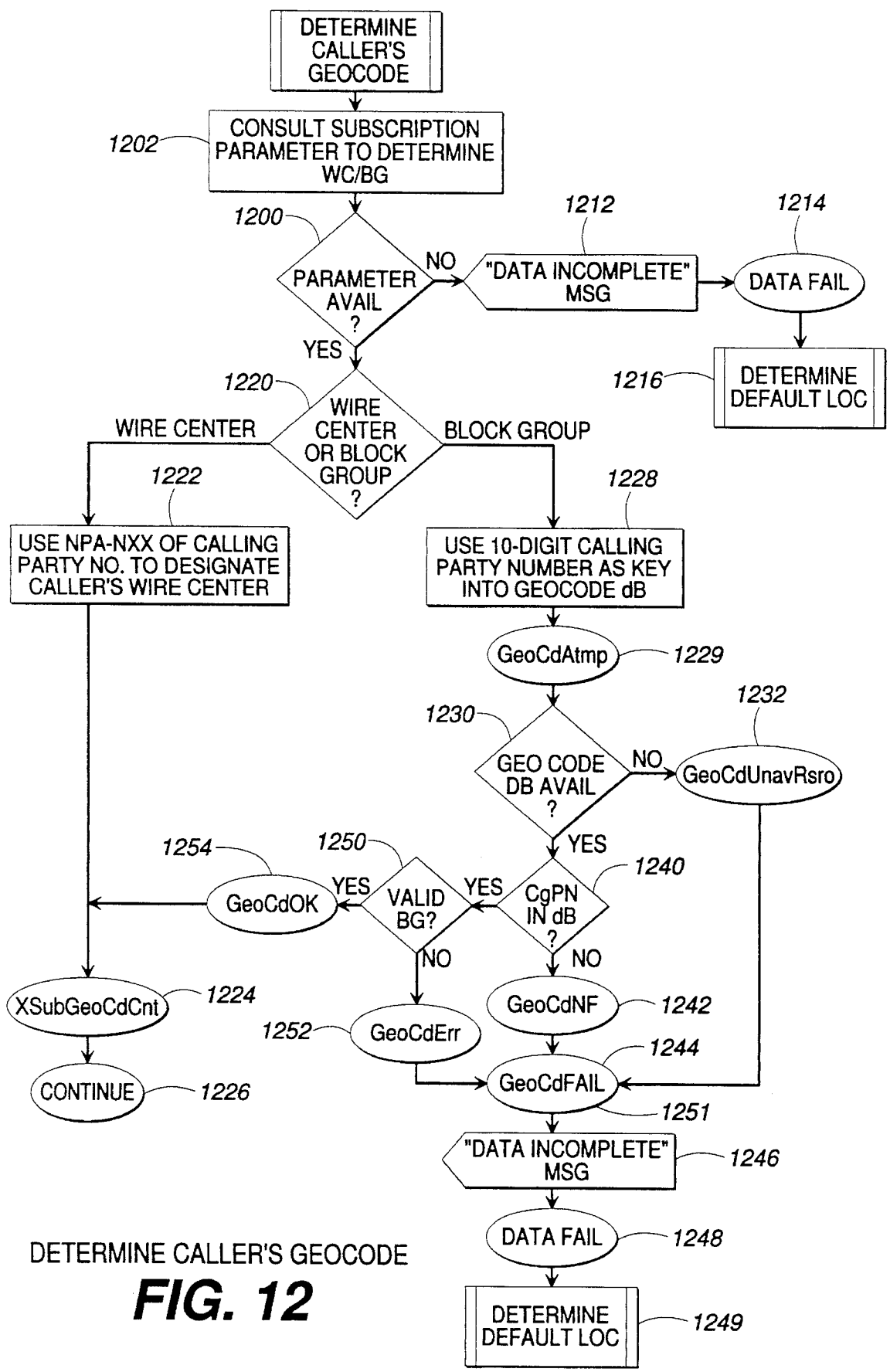
FIG. 12 is a flow diagram of the logic used to determine a caller's geocode.
Figure 13:
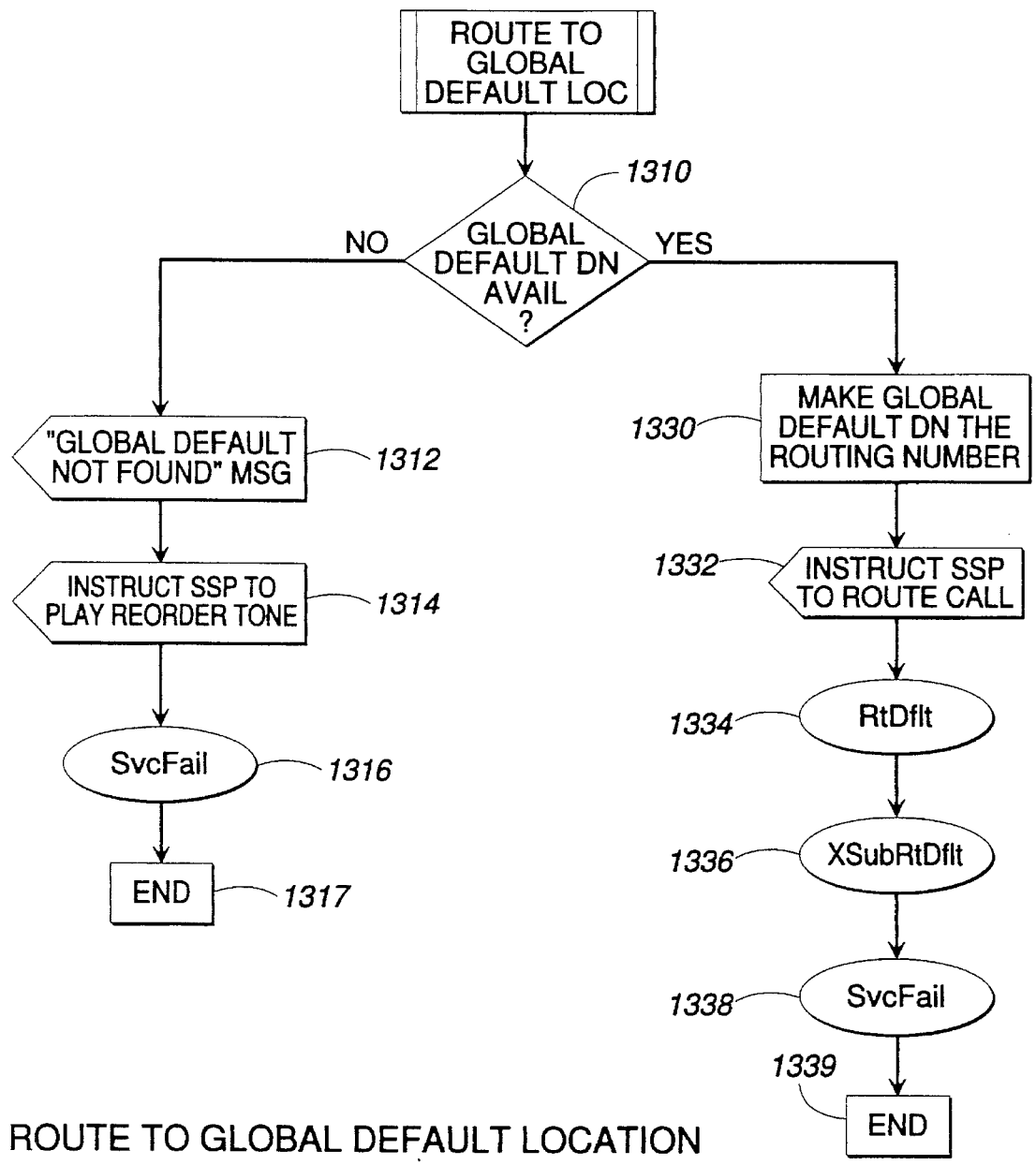
FIG. 13 is a flow diagram of the logic used to determine a global default location.
Figure 16:
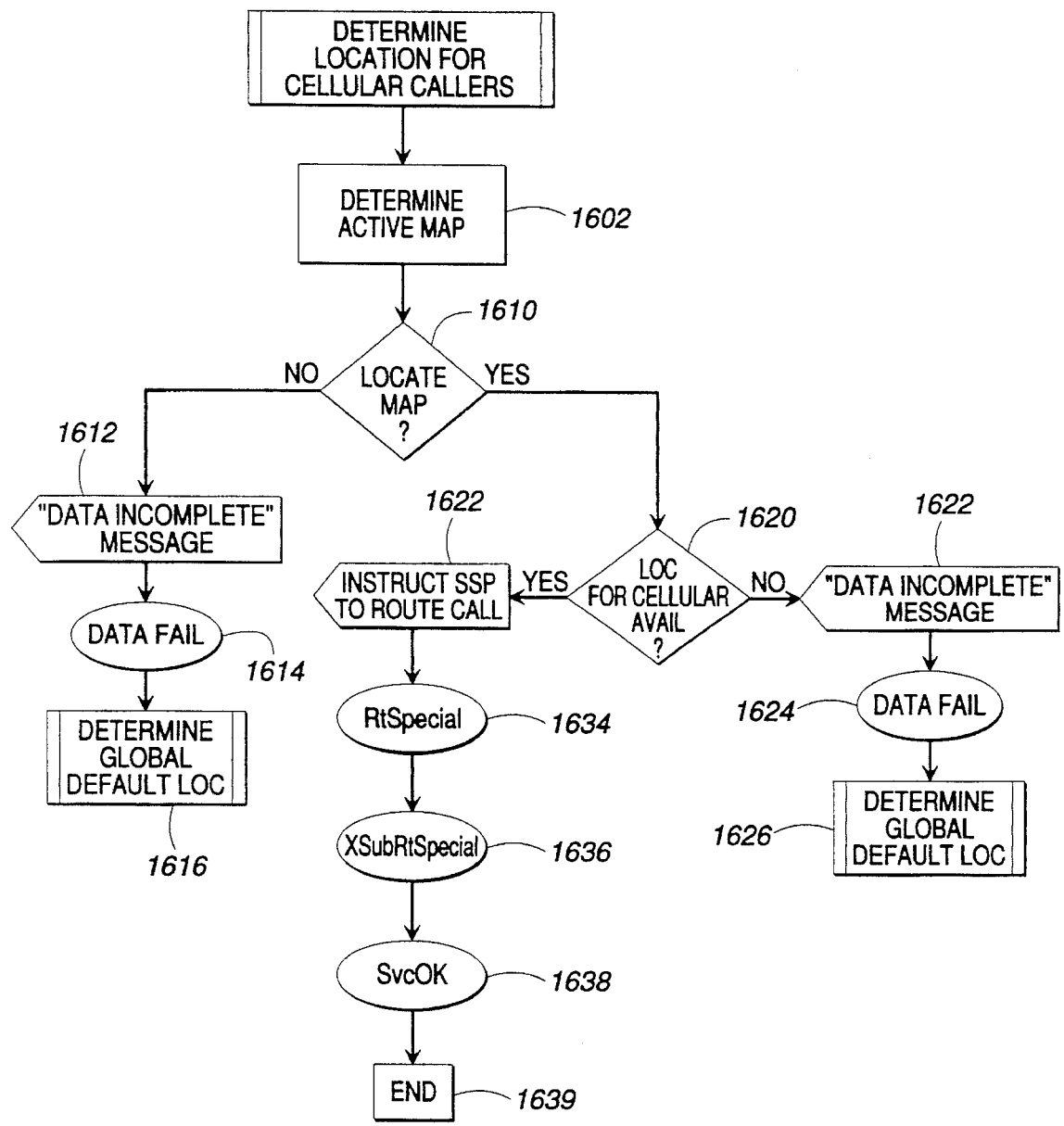
FIG. 16 is a flow diagram of the logic used to determine the location in which to route cellular callers.

At step 930, if the calling party number is available then, at step 940, a determination is made as to whether the call was received from a cellular caller. If the call was from a cellular caller, then at step 942 a location is determined for cellular callers as illustrated in FIG. 16. If, however, at step 940 the caller was not a cellular caller, then at step 944 the caller's geocode is determined as illustrated in FIG. 12. At step 946, the map active for a subscriber is determined with reference to the decision graph (DG'). If a map is located at step 950, then at step 952 a subscriber's location is determined as illustrated at FIG. 10. If, however, at step 950 a subscriber's map was not located then at step 954, the SCP 46 generates a data incomplete message. At step 956, a count is incremented representing the number of times the ANC service package application (SPA) 172 attempted to use items of subscription or service data but was unable to determine the value for this data. This count is incremented each time the data incomplete exception message is generated. At step 958, a caller is routed to a global default location as illustrated in FIG. 13.

If at step 930 a calling party number was not available, then at step 932 the subscription parameter is consulted for the number of attempts that a caller may have to enter a valid calling party number. At step 960 if the number of attempts permissible is zero, then a subscriber default location is determined at step 962. If, however, the multiple attempts to be provided are the default number of attempts, shown as two, then at step 970 it is determined whether an initial announcement ID is available.

At step 970 if an announcement identification (ID) for the initial prompt and collect announcement is available, then at step 971 the SCP 46 instructs the SSP 42 to prompt the caller to enter an appropriate number. At step 972 a count is incremented representing the number of times the SCP 46 returns a conversation message to the SSP 42 instructing the SSP 42 to play a prompt and collect announcement for the calling party number, as indicated by the label CllrRespAtmp. A tally representing the number of attempts by the caller is incremented at step 973. At step 974 the dialed digits are received at the SCP 46 from the SSP 42. At step 975 the digits are evaluated as illustrated in FIG. 14.

Figure 11:
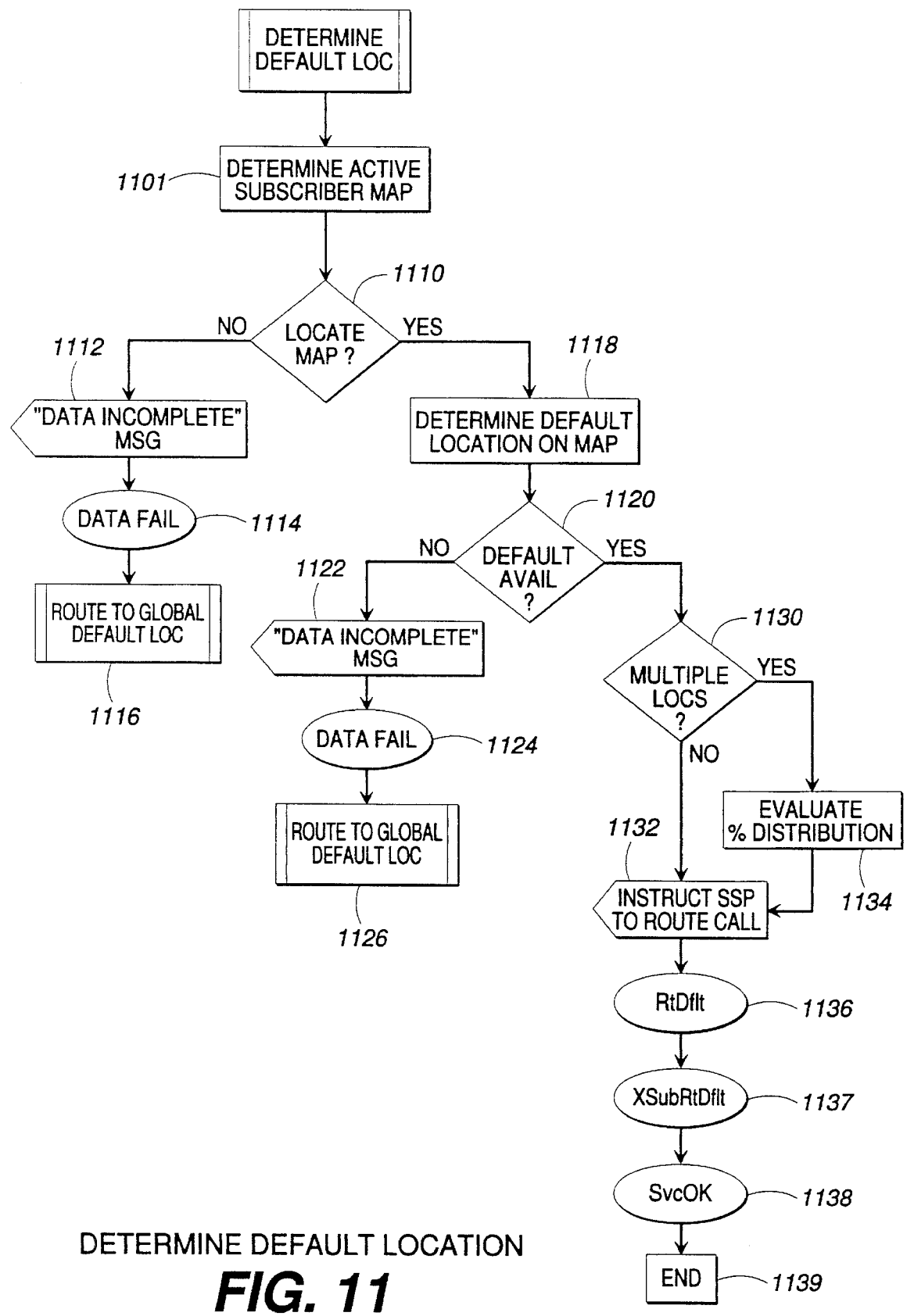
FIG. 11 is a flow diagram of the logic used to determine a default subscriber location.

If, however, at step 070 an initial announcement ID is not available, then at step 076 a data-incomplete message is generated by the SCP 46. At step 077, a count is incremented representing the number of times the ANC application 172 attempted to use items of subscription or service data but was unable to determine the value of this data, indicated by the label DataFail. This count is incremented each time the data-incomplete message is generated. This count indicates the validity and availability of subscription and service data and also reflects the volume of calls that receive default routing because of data failures during call processing. At step 978 a default location is determined as illustrated in FIG. 11.

Figure 15:
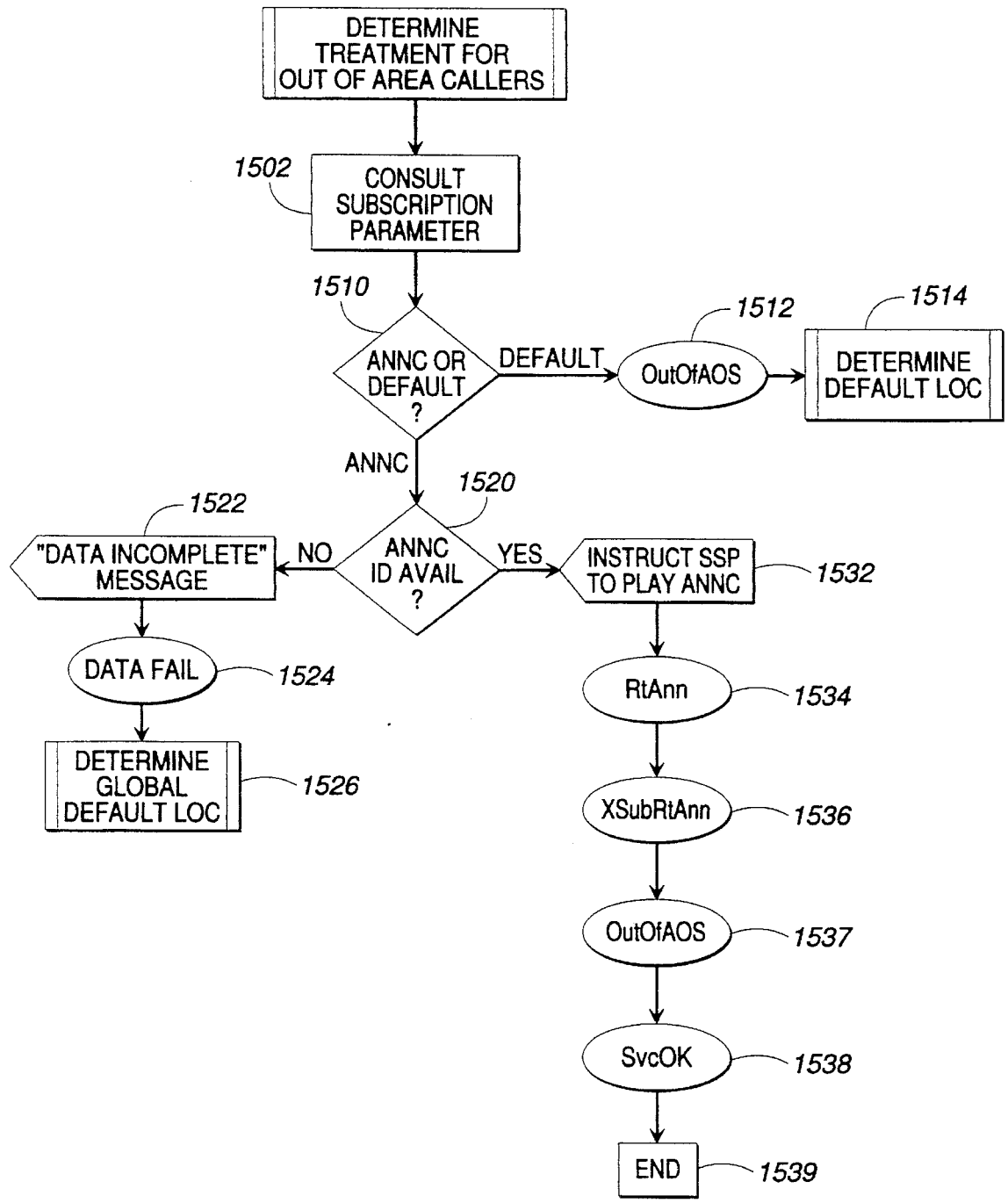
FIG. 15 is a flow diagram of the logic used to determine the treatment for out-of-area callers.

Referring to FIG. 10, a flow diagram of the logic used to determine a subscriber location is illustrated based on data supplied by means of the decision graph (DG'). At step 1000, the geocode (the block group to section table 250 (FIG. 6) or the wire center to section table 252 from the decision graph (DG')) is evaluated to determine whether or not a section has been defined for the geocode. If a section has not been defined for the geocode, then at step 1002 a determination is made for the treatment of the out-of-area callers as illustrated in FIG. 15. If, however, a section has been defined for the geocode, then at step 1020 a determination is made as to whether a region has been defined for the section.

If at step 1020 a region has not been defined for the section by the decision graph (DG'), then at step 1022 a data incomplete message is generated. At step 1024, a DataFail count is incremented. At 1026, a default location is determined as illustrated in FIG. 11. If, however, at step 1020 a region has been defined for the section, then at step 1040 a determination is made as to whether a subscriber location is available for that region.

At step 1040 if a subscriber location is not available for the region from the decision graph (DG'), then at step 1042 a data incomplete message is generated. A DataFail count is incremented at step 1044, and then at step 1046 a default location is determined as illustrated in FIG. 11. However, if a subscriber location is available for the region, then at step 1060 a determination is made as to whether the subscriber has multiple locations defined for that region by using the decision graph (DG').

At step 1060 if a subscriber does not have multiple locations defined for the region, then the SCP 46 instructs the SSP 42 to route the call at step 1062 to the single specified location. However, if at step 1060 the subscriber has multiple locations defined for the region, then at step 1064 the percentage distribution of calls between the various locations as requested by the subscriber is evaluated to determine the proper location to which the call should be directed. At step 1062 the SCP 46 instructs the SSP 42 to route the call. At step 1064 a count is incremented representing the number of times the SCP 46 returns a response message to the SSP 42 with routing instructions to route a call to the appropriate subscriber location, as indicated by the label RtNorm. At step 1066 a subscriber specific count is incremented representing the number of times the SCP 46 returns routing instructions to the SSP 42 that contain the directory number (DN) of a particular subscriber location as the routing number. This count is kept individually for each subscriber location, which is identified by its directory number, as indicated by the label XSubRtNorm. At step 1068, a count is incremented representing the number of response messages returned by the SCP 46 that contain routing instructions, as indicated by the label SvcOK. This includes routing to subscriber and default locations, as well as locations for cellular callers; however, it does not include routing to the global default location.

Referring to FIG. 11, a flow diagram of the logic for determining a subscriber default location is illustrated. At step 1101, the active subscriber map is determined. At step 1110 if a map was not located, then at step 1112 a data incomplete message is generated. At step 1114, the DataFail count is incremented. Then at step 1116, the call is routed to a global default location as illustrated in FIG. 13. If, however, at step 1110 a subscriber map was located, then at step 1118 a default location is determined on the map.

At step 1120, if a default was not available, then at step 1122 a data incomplete message is generated, and at step 1124, the DataFail count is incremented. The call is routed to the global default location of the subscriber at step 1126 as illustrated in FIG. 13. If at step 1120 a default location is available, then a determination is made at step 1130 as to whether a subscriber has indicated multiple default locations.

At step 1130, if a subscriber has not indicated multiple default locations, then at step 1132 the SCP 46 instructs the SSP 42 to route the call. However, at step 1130, if it is determined that multiple default locations have been indicated, then at step 1134 the percentage distribution to each of the default locations is determined and selected according to the subscriber's specifications, and then at step 1132 the SCP 46 instructs the SSP 42 to route the call. At step 1136 a count is incremented representing the number of times the SCP 46 returns a response message to the SSP 42 with routing instructions to route a call to the subscriber's default location, as indicated by the label RtDflt. This parameter identifies the number of times the ANC application 172 was unable to successfully evaluate the subscription data to determine an appropriate subscriber location to which to route the call, but was able to determine the subscriber's default location on the active map. At step 1137, the subscriber-specific count is incremented representing the number of times the SCP 46 returns routing instructions to the SSP 42 that contain the dialed number of a particular default subscriber location as the routing number, as indicated by the label XSubRtDflt. This count is kept individually for each of the subscriber's default locations, which is identified by its directory number. This count indicates to a subscriber how many calls the SCP 46 attempted to route to each of the subscriber's default locations. At step 1138 the SvcOK count is incremented. At step 1139, the default location determination ends.

Referring to FIG. 12, a flow diagram of the logic used to determine a caller's geocode is illustrated. At step 1202, the SCP 46 evaluates the subscriber's subscription parameter to determine whether the subscriber has chosen wire center or block group processing of the telephone calls. At step 1210, a determination is made as to whether a parameter is available to indicate wire center or block group routing.

At step 1210 if a wire center/block group parameter is not available then at step 1212 a data incomplete message is generated. At step 1214, the DataFail count is incremented. Then at step 1216 the subscriber's default location is determined as illustrated in FIG. 11. However, if at step 1210 a wire center/block group parameter is available, then at step 1220, a determination is made as to whether the parameter is wire center or block group.

At step 1220 if the parameter is a wire center parameter, then at step 1222 the SCP uses the NPA-NXX of the calling party's number to designate the caller's wire center. At step 1224, a subscriber-specific count is incremented representing the number of calls received from each geocode within the subscriber's area of service, as indicated by the label XSubGeoCdCnt. At step 1226 continue to process the ANC feature logic at step 946 of FIG. 9. However, if at step 1220 a block group parameter is detected, then at step 1228 the SCP uses the 10-digit calling party number as the key into the geocode database. At step 1229 a count is incremented representing the number of times the ANC application 172 attempts to access the geocode database, indicated by the label GeoCdAtmp.

If at step 1230 a geocode database is not available, then at step 1232 a count is incremented representing the number of times either of the following events occurs: (1) the ANC application 172 (FIG. 2) cannot access the geocode database because the geocode database interface unit 174 is unavailable or (2) the application times out waiting for a response from the geocode database interface unit 174, as indicated by the label GeoCdUnavRsrc. This count provides a measure of the unavailability of the geocode database interface unit 174. At step 1244, a count is incremented representing the number of times an event error occurs when accessing the geocode database, as indicated by the label GeoCdFail. This includes those errors for which the measurements of GeoCdUnavRsrc, and GeoCdErr and GeoCdNF are incremented as well, as well as any other errors that may occur when accessing the geocode database. However, if at step 1230 the geocode database is available, then a determination is made as to whether the calling party number is included in the database at step 1240.

At step 1240 if the calling party number is not in the geocode database from the decision graph (DG'), then at step 1242 a count is incremented representing the number of times the calling party number could not be found in the geocode database, as indicated by the label GeoCdNF. This count provides a measure of the quality of the data in the geocode database. At step 1244 the GeoCdFail count is incremented. At step 1246 a data incomplete message is generated. At step 1248 the DataFail is incremented and at step 1249 the default subscriber location is determined. However, if at step 1240 the calling party number is in the database, then a determination is made at step 1250 as to whether the number is a valid block group number.

At step 1250 if the number is not a valid block group number, then at step 1252 a count is incremented representing the number of times the calling party number could be found in the geocode database but the block group identifier field associated with it was either blank or invalid, as indicated by the label GeoCdErr. This count also provides a measure of the quality of the data in the geocode database. Then at step 1244 the GeoCdFail count is incremented and then steps 1246, 1248 and 1249 are executed as discussed above. However, if at step 1250 the number is a valid block group number, then at step 1254 a count is incremented representing the number of times the block group identifier could be successfully retrieved from the geocode database for a calling party number. This count is used for planning and engineering, performance, and maintenance purposes. Following step 1254, steps 1224 and 1226 are executed as discussed above.

Referring to FIG. 13, a flow diagram of the logic used to route to the global default location is illustrated. At step 1310, if no global default directory number is available, then at step 1312 a "global default not found" message is generated. At step 1314 the SCP 46 instructs the SSP 42 to play a reorder tone. At step 1316 a count is incremented representing the number of times a vacant code announcement had to be provided because the call could not even be routed to the global default location. This count identifies the number of times the ANC application 172 (FIG. 2) was unsuccessful in implementing the subscription data to handle the call appropriately. At step 1319, the global default routine ends.

If at step 1310 a global default directory number is available, then at step 1330 the global default directory number is used as the routing number. At step 1332 the SCP 46 instructs the SSP 42 to route the call. At step 1334 the RtDflt count is incremented, and then at step 1336 the XSubRtDflt count is incremented. At step 1338, a count is incremented representing the number of response messages returned by the SCP 46 that contain routing instructions to the global default location, indicated by the label SvcFail label, and then at step 1339 global default location ends.

Figure 14A:
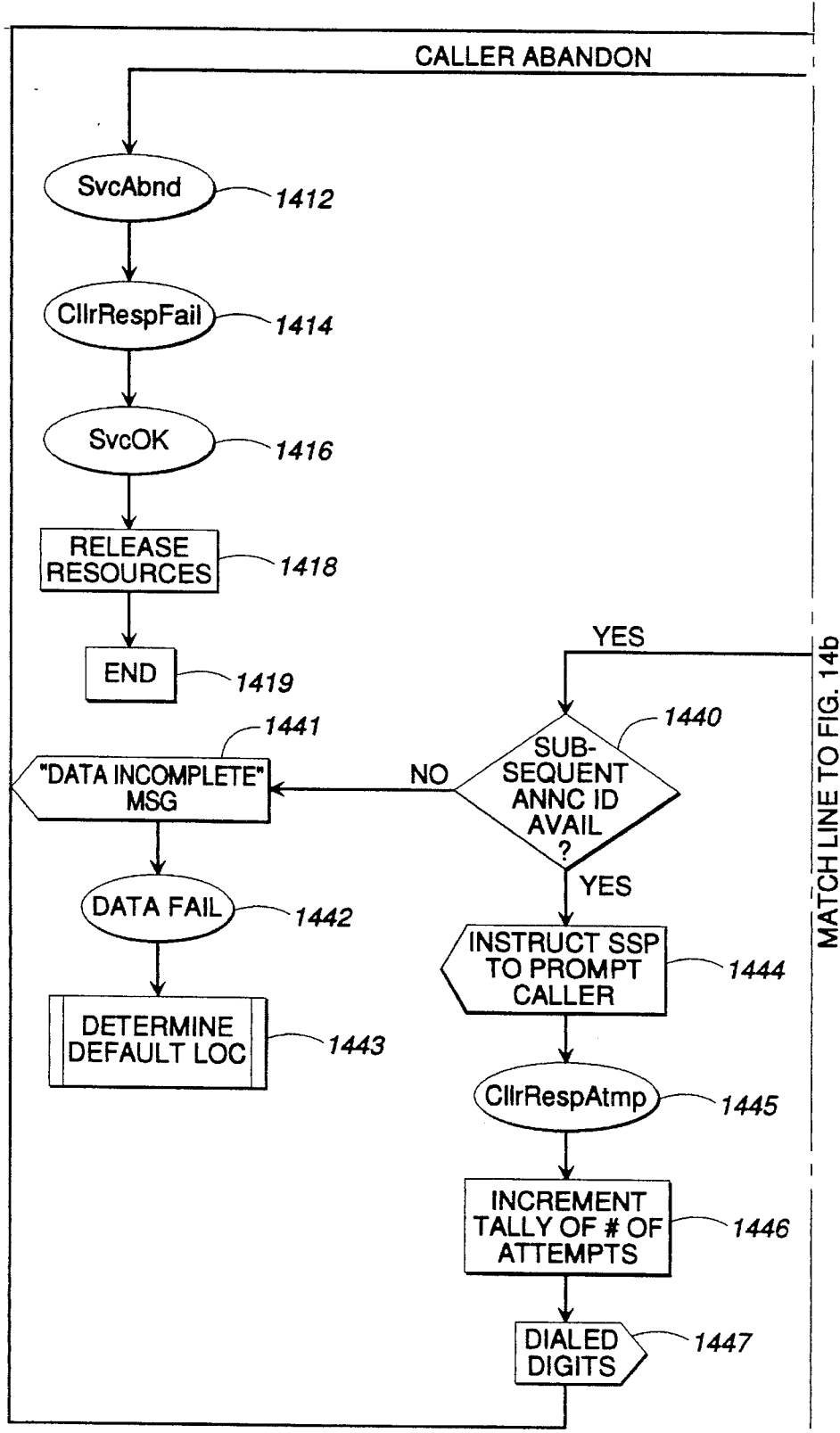
FIGS. 14a and 14b are flow diagrams of the logic used to evaluate dialed digits.
Figure 14B:
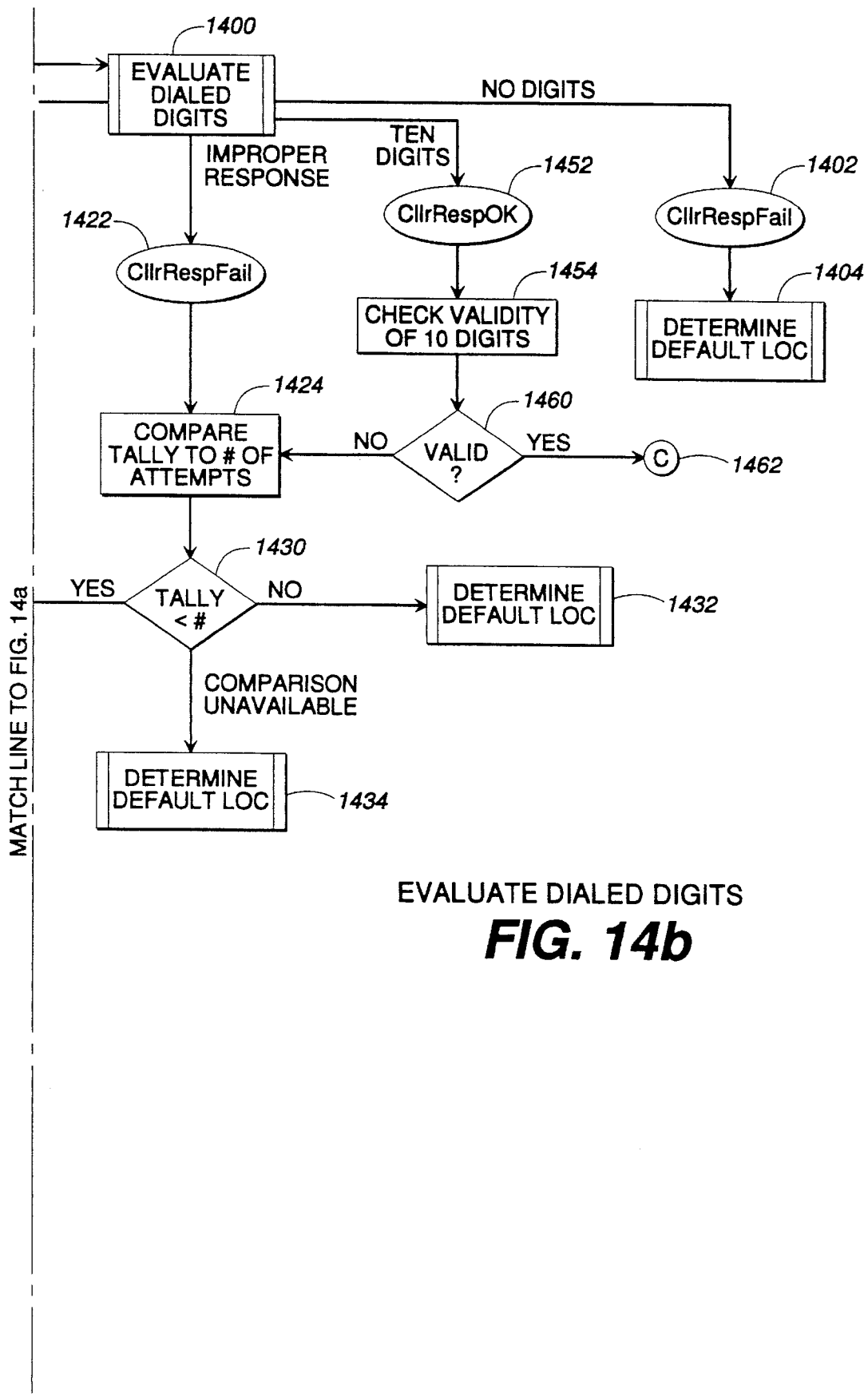

Referring to FIG. 14, comprising FIGS. 14a and 14b, a flow diagram of the logic for evaluating the dialed digits is illustrated. If no digits are available, then at step 1402 a count is incremented representing the number of times the SCP 46 receives a conversion message from the SSP 42 containing a return result component where one of the following is included: (1) standard user error code set to caller abandon, (2) standard user error code set to improper caller response, or (3) number of digits part of the digits-caller interaction parameter set to 0, as indicated by the label CllrRespFail. This count helps to evaluate the traffic effect of prompting and collecting input from callers. At step 1404, a subscriber default location is determined as illustrated in FIG. 11.

If the caller has abandoned the call at step 1412, a count is incremented representing the number of response messages sent to the SCP 46 from the SSP 42 that contain a standard user error code set to caller abandon, as indicated by the label SvcAbnd. At step 1414 the CllrRespFail count is incremented, then at step 1416 the SvcOK count is incremented. At step 1418 the resources are released, and then at step 1419 the evaluation of the digits ends. At step 1400, if an improper caller response was received, then at step 1422 the CllrRespFail count is incremented. At step 1424, the tally is compared to the number of allowed attempts.

At step 1430 if the tally is not less than the number of attempts specified, then at step 1432 a subscriber default location is determined as illustrated in FIG. 11. If at step 1430, a comparison is unavailable, then at step 1434 a default location is determined as illustrated in FIG. 11. If at step 1430, the tally is less than the number of specified attempts, then at step 1440 a determination is made as to whether subsequent announcement ID for the subsequent prompt and collect announcement is available.

If at step 1440 a subsequent announcement identification is not available, then at step 1441 a data incomplete message is generated. At step 1442 the DataFail count is incremented, and then at step 1443 a subscriber default location is determined as illustrated in FIG. 11. If at step 1440 a subsequent announcement identification is available, then at step 1444 the SCP 46 instructs the SSP 42 to prompt a caller to enter digits. At step 1445, the CllrRespAtmp count is incremented. At step 1446 the tally representing the number of attempts is incremented. At step 1447 the SSP waits to receive the dialed digits from the caller, and then the caller's response is evaluated at step 1400.

If at step 1400 ten digits are received, then at step 1452 a count is incremented representing the number of times the SCP 46 receives a conversation message from the SSP 42 containing a return result component where the number of digits in the digits-caller interaction parameter is ten, as indicated by the label CllrRespOK. This count indicates whether or not a caller entered ten digits after hearing a prompt and collect announcement for the calling number. This count also helps to evaluate the traffic effect of prompting and collecting input from callers. At step 1454 the validity of the ten digits entered is evaluated. Then at step 1460 if the ten digits entered are not valid, then at step 1424 the evaluation sequence discussed above is implemented. If, however, at step 1460, the ten digits are valid, then at step 1462 the logic is followed beginning at point C illustrated on FIG. 9.

Referring to FIG. 15, a flow diagram of the logic used to determine the treatment for out-of-area callers is illustrated. At step 1502 the SCP 46 consults or evaluates the subscriber's subscription parameters. At step 1510 a determination is made as to whether the parameters specify an announcement ID or a default. If the parameter indicates a default at step 1510, then at step 1512 a count is incremented representing the number of times the SCP 46 returns a response message to the SSP 42 with instructions to either provide a denial announcement or route the call to a default location because the calling party number was determined to be outside of the subscriber's area of service, as indicated by the label "OutOfAOS." This measurement helps in evaluating service performance because it helps to reflect the number of calls that could have been routed to the default location intentionally, rather than because of missing data or processing errors. At step 1514 a default location is determined as illustrated in FIG. 11. If, however, at step 1510 an announcement ID was indicated as a parameter, then the announcement ID is evaluated at step 1520.

At step 1520 if the announcement ID was not available, then at step 1522 a data incomplete message is generated. At step 1524 the DataFail count is incremented. Then at step 1526 the SCP 46 determines the global default location for the subscriber as illustrated in FIG. 13. At step 1520 if it is determined that the announcement ID is available, then at step 1532 the SCP 46 instructs the SSP 42 to play an announcement. At step 1534, a count is incremented representing the number of times the SCP 46 returns a response message to the SSP 42 with instructions to play a terminating announcement, indicated by the label "RtAnn." This counts helps to determine the usage of the denial announcement for out-of-area callers. At step 1536 the count is incremented representing the number of times the SCP 46 sends a response message to the SSP 42 instructing the SSP 42 to provide the denial announcement for out-of-area callers, on behalf of a particular subscriber, indicated by the label "XSubRtAnn." This count need only be kept only for those subscribers who have specified in the subscription parameter that out-of-area callers should be provided with an announcement, rather than being routed to the default location. This count indicates the number of out-of-area calls that the subscriber is receiving. At step 1537, the OutOfAOS count is incremented. At step 1538 the SvcOK count is incremented, and then at step 1539, the out-of-area call is ended.

Referring to FIG. 16, a flow diagram of the logic used to determine the location for cellular callers is illustrated. At step 1602 the subscriber's active map is determined. At step 1610 an attempt is made to locate the map. If the map is not located at step 1610, then at step 1612, the data incomplete message is generated. At step 1614 the DataFail count is incremented, then at step 1616 the subscriber's global default location is determined as illustrated in FIG. 13. However, if at step 1610, the subscriber's map is located, then at step 1620 a determination is made as to whether a location for a cellular caller is available.

If at step 1620 no location is available for a cellular caller, then at step 1622 a data incomplete message is generated. At step 1624 the DataFail count is incremented, then at step 1626 the subscriber's global default location is determined as illustrated in FIG. 13. However, if at step 1620, a location is available for a cellular caller, then at step 1632 the SCP 46 instructs the SSP 42 to route the call. At step 1634 a count is incremented representing the number of times the SCP 46 returned the response message to the SSP 42 with routing instructions to route a call to the location specified for cellular callers, as indicated by the label "RtSpecial." This count identifies the number of times the ANC application 172 (FIG. 2) could identify a cellular NPA-NXX and instruct the SSP 42 to route the call to the location for cellular callers on the subscriber's active map. At step 1636 a subscriber-specific count is incremented representing the number of times that the SCP 46 returns routing instructions to the SSP 42 that contains the directory number of a particular location to which cellular callers are sent as the routing number, as indicated by label "XSubRtSpecial." This count is kept individually for each location the subscriber designates for receiving cellular calls, and this location is identified by its ten-digit dialed number. This count indicates the number of calls the SCP 46 attempted to route to each of the subscriber locations designated for receipt of cellular calls. At step 1638 the SvcOK count is incremented, and then at step 1639 the call is ended.

The foregoing relates to the preferred embodiment of the present invention, and many changes may be made therein without departing from the scope of the invention as defined by the following claims.

We claim:

1. A method of routing a call from a caller to a particular subscriber location of a plurality of subscriber locations said subscriber locations located in a predetermined geographic area, based in part on the geographic location of the caller, said call being placed by dialing a single telephone number that is operative for serving all of said subscriber location, comprising the steps of:

retrieving a block group identifier from a database based on all the digits, including the area code, of the calling party number of said caller, said block group identifier being a value, in said database, that represents the block group area from which said call originated;

correlating said block group identifier to a common identifier, said common identifier being a value in said database representing an intersection data set of a plurality of intersection data sets, said intersection data sets created by:

defining a first geographic map area as a geographic data set representing said predetermined geographic area, said geographic map area encompassing a plurality of block group areas;

dividing said first geographic map area into a first set of first regions thereby defining a first region set, each of said first regions encompassing at least one of said block group areas and each of said first regions corresponding to a preselected location for receiving a call from the corresponding first region, said first region set designated for calls made during a first time interval:

dividing said first geographic map area into a second set of second regions thereby defining a second region set, each of said second regions encompassing at least one of said block group areas and each of said second regions corresponding to a preselected location for receiving a call from the corresponding second region, said second region set designated for calls made during a second time interval; and intersecting said first region set with said second region set thereby defining intersection data sets common to said first region set and said second region set, said intersection data sets containing a quantity of data less than the sum of the quantity of data contained in said first region set and said second region set, said intersection data sets operative for call routing during both said first time interval and said second time interval, thereby reducing the total amount of data associated with routing calls from each of said dividing steps; and routing said call to a particular subscriber location based on said common identifier.

2. The method of claim 1 further comprising the step of routing said call based on the time that said call was received.

3. The method of claim 1 further comprising the step of correlating said common identifier to one of said regions of one of said groups.

4. The method of claim 3 further comprising the step of correlating said one of said regions to a particular subscriber location.

5. The method of claim 4 wherein said step of routing said call comprises routing said call to a particular subscriber location based on a distribution percentage of calls to subscriber locations.

6. The method of claim 1 wherein said step of routing said call comprises routing said call to a particular subscriber location based on a distribution percentage of calls to subscriber locations.

7. The method of claim 1 wherein said step of routing said call comprises routing said call to a subscriber default location.

8. The method of claim 7 wherein said step of routing said call to a particular subscriber location comprises routing said call to a particular default location of a plurality of default locations based on a distribution percentage of calls to subscriber locations.

9. The method of claim 7 wherein said step of routing said call to a default location comprises routing said call to a default location when a common identifier is not defined for said particular subscriber location.

10. The method of claim 3 wherein said step of routing said call to a particular subscriber location comprises routing said call to a default location when a region is not defined for said particular subscriber location.

11. The method of claim 1 further comprising the step of maintaining and periodically updating said first data table independent of customer equipment.

12. The method of claim 1 further comprising the step of recording the number of calls from each block group.

13. The method of claim 1 further comprising the step of recording the total number of calls to said single telephone number.

14. The method of claim 1 further comprising the step of recording the number of calls routed to a particular subscriber location.

15. A method of routing a call from a caller to a particular subscriber location of a plurality of subscriber locations, said subscriber locations located in a predetermined geographic area, based in part on the geographic location of the caller, said call being placed by dialing a single telephone number that is operative for serving all of said subscriber locations, comprising the steps of:

retrieving a geographic code from a database based on the calling party number of said caller, said geographic code representing a predefined geographic area from which said call originated;

correlating said geographic code to a common identifier, said common identifier representing an intersection data set of a plurality of intersection data sets, said intersection data sets created by:

defining a first geographic map area as a geographic data set representing said predetermined geographic area, said geographic map area encompassing a plurality of predefined geographic areas:

dividing said first geographic map area into a first set of first regions thereby defining a first region set, each of said first regions encompassing at least one of said predefined geographic areas and each of said first regions corresponding to a preselected location for receiving a call from the corresponding first region, said first region set designated for calls made during a first time interval dividing said first geographic map area into a second set of second regions thereby defining a second region set, each of said second regions encompassing at least one of said predefined geographic areas and each of said second regions corresponding to a preselected location for receiving a call from the corresponding second region, said second region set designated for calls made during a second time interval and intersecting said first region set with said second region set thereby defining intersection data sets common to said first region set and said second region set, said intersection data sets containing a quantity of data less than the sum of the quantity of data contained in said first region set and said second region set, said intersection data sets operative for call routing during both said first time interval and said second time interval, thereby reducing the total amount of data associated with routing calls from each of said dividing steps; and routing said call to a particular subscriber location based on said common identifier.

16. The method of claim 15 further comprising the step of determining whether one of a plurality of routing levels is to be utilized.

17. The method of claim 16 wherein said step of determining whether one of a plurality of routing levels comprises determining whether the routing level is a wire center routing level or a block group routing level.

18. The method of claim 17 further comprising the step of routing said call based on the time that said call was received.

19. The method of claim 15 further comprising the step of correlating said common identifier to one of said regions of one of said groups.

20. The method of claim 19 further comprising the step of correlating said one of said regions to a particular subscriber location.

21. The method of claim 20 wherein said step of routing said call comprises routing said call to a particular subscriber location based on a distribution percentage of calls to subscriber locations.

22. The method of claim 21 wherein said step of routing said call comprises routing said call to a subscriber default location.

23. The method of claim 22 wherein said step of routing said call to a particular subscriber location comprises routing said call to a particular default location of a plurality of default locations based on a subscriber distribution percentage.

24. The method of claim 22 wherein said step of routing said call to a default location comprises routing said call to a default location when a common identifier is not defined for said particular subscriber location.

25. The method of claim 15 further comprising the step of maintaining and periodically updating said first database independent of customer equipment.

26. The method of claim 15 further comprising the step of recording the number of calls from each block group.

27. The method of claim 15 further comprising the step of recording the total number of calls to said single telephone number.

28. The method of claim 15 further comprising the step of recording the number of calls routed to a particular subscriber.

29. The method of claim 15 wherein said step of retrieving a geographic code comprises retrieving a geographic code corresponding to a wire center code.

30. The method of claim 16 wherein said step of determining whether one of a plurality routing levels comprises determining whether the routing level is a wire center routing level or a block group routing level.

31. The method of claim 30 further comprising the step of routing said call based on the time that said call was received.

32. The method of claim 31 further comprising the step of correlating said common identifier to one of said divisions of one of said groups.

33. The method of claim 32 further comprising the step of correlating said one of said divisions to a particular subscriber location.

34. The method of claim 33 wherein said step of routing said call comprises routing said call to a particular subscriber location based on a distribution percentage of calls to subscriber locations.

35. The method of claim 34 wherein said step of routing said call comprises routing said call to a subscriber default location.

36. The method of claim 16 wherein said step of determining whether one of a plurality routing levels comprises determining whether the routing level is a wire center routing level or a block group routing level.

37. The method of claim 36 further comprising the step of routing said call based on the time that said call was received.

38. The method of claim 36 further comprising the step of correlating said common identifier to one of said divisions one of said groups.

39. The method of claim 38 further comprising the step of correlating said one of said divisions to a particular subscriber location.

40. The method of claim 39 wherein said step of routing said call comprises routing said call to a particular subscriber location based on a distribution percentage of calls to subscriber locations.

41. The method of claim 40 wherein said step of routing said call comprises routing said call to a subscriber default location.

42. A method of reducing the amount of data associated with initially identified data tables for use in routing calls, comprising:

defining an initial set of data;

dividing said initial set of data into a first subset of data;

dividing said initial set of data into a second subset of data;

intersecting said first set with said second set thereby defining union sets common to said first and second sets; and utilizing said union sets to route calls to selected destinations.

43. A method of reducing the amount of data representing geographic areas and associated with routing calls from a predetermined geographic area, comprising the steps of:

defining a first geographic map area as a first geographic data set representing said predetermined geographic area, said geographic map area encompassing a plurality of second areas;

dividing said first geographic data set into a first set of first regions thereby defining a first region set, each of said first regions encompassing at least one of said second areas and each of said first regions corresponding to a preselected location for receiving a call from the corresponding first region, said first region set designated for calls made during a first time interval;

dividing said first geographic data set into a second set of second regions thereby defining a second region set, each of said second regions encompassing at least one of said second areas and each of said second regions corresponding to a preselected location for receiving a call from the corresponding second region, said second region set designated for calls made during a second time interval;

reducing the total amount of data associated with routing calls from each of said dividing steps by intersecting said first region set with said second region set thereby defining intersection data sets common to said first region set and said second region set; and storing said intersection data sets to be used for call routing during both said first time interval and said second time interval thereby said step of storing said intersection data sets to be used for call routing containing a quantity of data less than the sum of the quantity of data contained in said first region set and second region set.

44. The method of claim 22 wherein said step of routing said call to a particular subscriber location comprises routing said call to a default location when a division is not defined for said particular subscriber location.

45. In an intelligent switched telephone network that includes a plurality of digital data communications channels between a plurality of central offices, at least one service switching point, at least one signal transfer point, and at least one service management system interfaced with a service control point (SCP), a method of providing call routing data to said SCP for use in call routing, comprising the steps of:

receiving a set of files identifying geographic regions selected by a subscriber at said service management system;

correlating said files of geographic regions to said subscriber, said subscriber having various locations designated to receive calls from said geographic regions, said correlating being in a first format;

associating call routing information to an identifier for said geographic regions, said call routing information specifying the order in which call data is processed, said associating being in a second format;

combining, via a computer implemented process, said first format and said second format to yield final call routing information, said final call routing information containing ordered steps in which calls from said geographic regions of said subscriber are to be processed according to said call routing information; and transmitting said final call routing information to said SCP for use in routing calls.

46. A method of routing a call to a particular subscriber location of a plurality of subscriber locations based on service parameters of the subscriber and in part on the geographic location of the caller comprising the steps of:

manipulating a first set of predetermined call routing assignments that provide a specified call routing service for a plurality of subscriber locations to form a second set of call routing assignments that provide said specified call routing service for said plurality of subscriber locations, said second set of call routing assignments comprising a reduced number of assignments from said first set; and routing said call to said particular location based on said second set of call routing assignments.

47. The method of claim 45 wherein said first format is in the form of data tables.

48. The method of claim 47 wherein said second format is in an ASCII format.

49. A method of routing a call from a caller to a particular subscriber location of a plurality of subscriber locations based in part on the geographic location of the caller, said call being placed by dialing a single telephone number that is operative for serving all of said subscriber locations, comprising the steps of: providing a first set of areas assigned for routing to preselected subscriber locations for a preselected first time interval; providing a second set of areas assigned for routing to preselected subscriber locations for a preselected second time interval;

comparing said assignments to identify which areas are grouped together for routing regardless of which time interval is being considered; and utilizing said areas identified in said step of comparing for call routing.

* * * * *